(12) United States Patent
Kagotani et al.

(10) Patent No.: US 7,057,260 B2
(45) Date of Patent: Jun. 6, 2006

(54) METHOD OF MAKING THIN-FILM MAGNETIC HEAD

(75) Inventors: Tsuneo Kagotani, deceased, late of Chuo-ku (JP); by Teruyo Kagotani, legal representative, Saku (JP); Noriaki Kasahara, Chuo-ku (JP); Hitoshi Hatake, Chuo-ku (JP)

(73) Assignee: TDK Corporation, Tokyo (JP)

( * ) Notice: Subject to any disclaimer, the term of this patent is extended or adjusted under 35 U.S.C. 154(b) by 505 days.

(21) Appl. No.: 10/379,588

(22) Filed: Mar. 6, 2003

(65) Prior Publication Data

US 2003/0182789 A1    Oct. 2, 2003

(30) Foreign Application Priority Data

Mar. 27, 2002    (JP) .............................. 2002-089468

(51) Int. Cl.
*H01L 23/544* (2006.01)
*G11B 5/127* (2006.01)
*B32B 15/00* (2006.01)

(52) U.S. Cl. ...................... 257/620; 257/295; 257/296; 257/421; 257/422; 360/313; 360/314; 360/317; 428/209; 428/185; 428/469

(58) Field of Classification Search ..................... None
See application file for complete search history.

(56) References Cited

U.S. PATENT DOCUMENTS 6,534,159 B1 *  3/2003  Newman et al. ............ 428/209
6,886,239 B1 *  5/2005  Kasahara et al. ........ 29/603.13

* cited by examiner

*Primary Examiner*—David Nelms
*Assistant Examiner*—Long Tran
(74) *Attorney, Agent, or Firm*—Oliff & Berridge, PLC

(57) ABSTRACT

In the method of making a thin-film magnetic head in accordance with the present invention, an alignment mark is electrically connected to a multilayer film which will later become a TMR film. Therefore, when the alignment mark is irradiated with a position correcting electron beam in order to correct a drawing position in the subsequent step of electron beam lithography, electric charges of the electron beam flow into the multilayer film without staying in the alignment mark. As a consequence, the position correcting electron beam does not lose its straightforwardness, whereby the drawing position in electron beam lithography can be corrected accurately.

2 Claims, 26 Drawing Sheets

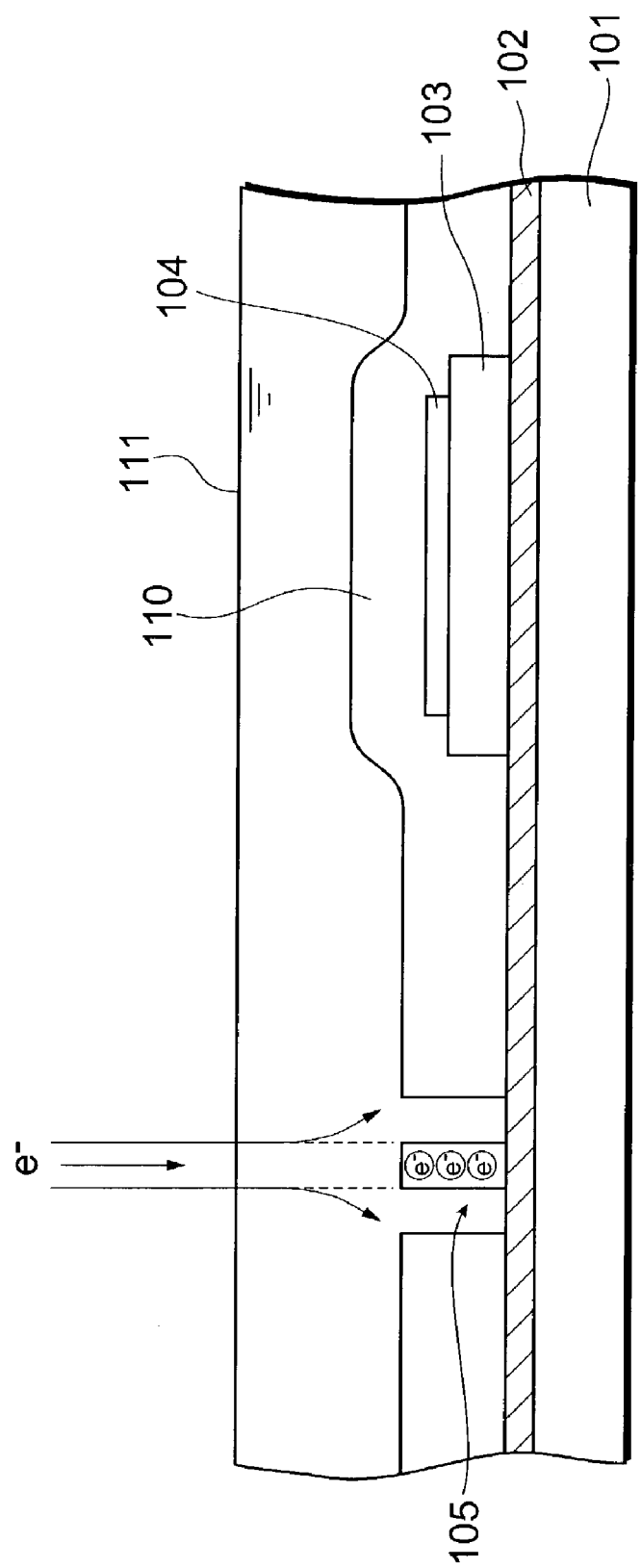

METHOD OF MAKING THIN-FILM MAGNETIC HEAD

BACKGROUND OF THE INVENTION

1. Field of the Invention

The present invention relates to a method of making a thin-film magnetic head using a magnetoresistive device, a method of making a magnetoresistive device assembly, a method of making a head gimbal assembly, a method of making a hard disk drive, and a magnetoresistive device assembly.

2. Related Background Art

In recent years, as the areal density in hard disk drive (HDD) improves, thin-filmmagnetic heads playing an important role in recording and reproducing magnetic information have been required to improve their performances. As a thin-film magnetic head, a combination thin-filmmagnetic head in which a reproducing head having a magnetoresistive (MR) device and a recording head having an induction type magnetoresistive device are stacked together has recently become mainstream in place of those using an induction type magnetoresistive device for both recording and reproducing. Known as MR devices are AMR (Anisotropy Magneto Resistive) devices utilizing anisotropic magnetoresistive effect, GMR (Giant Magneto Resistive) devices utilizing giant magnetoresistive effect, TMR (Tunnel-type Magneto Resistive) devices, etc.

An example of requirements for reproducing heads is to make MR films have a very narrow track width in order to improve their reading performance. A narrow track width in MR films makes it possible to reproduce magnetic information in a hard disk having a high areal density. To respond to such a requirement, high-precision fine processing must be realized. Therefore, attempts have been made to utilize electron beam lithography capable of drawing with a precision higher than that in photolithography which had often been used in the making of thin-film magnetic heads. Electron beam lithography can make fine pattern forms, since it utilizes electron beams having a wavelength shorter than that of light.

SUMMARY OF THE INVENTION

However, the above-mentioned conventional manufacturing technique utilizing electron beam lithography has been problematic as explained in the following. For example, when patterning a TMR film on a substrate, the TMR film is coated with an electron beam resist and then is irradiated with an electron beam so as to form a desirable resist pattern, whereas drawing positions are corrected before the electron beam irradiation. For correcting the drawing positions, an alignment mark formed at an appropriate position of the substrate is initially scanned with a position correcting electron beam, and the intensity of reflected electrons occurring at this time is measured. After the position of alignment mark is detected according to the intensity of reflected electrons, the position of an optical system for emitting the drawing electron beam or the position of a stage for supporting the substrate is corrected according to the detected alignment mark position.

However, there has conventionally occurred a state where the drawing position cannot be corrected accurately, whereby the drawing electron beam cannot be emitted as aimed. In this case, the above-mentioned example fails to form the resist layer into a desirable pattern, thus making it difficult to narrow the track width of MR films such as TMR films. If the irradiation position of drawing electron beam is not accurate, reproducing track positions may shift or overlap with patterns formed in other layers, whereby the thin-film magnetic head may fail to function.

Such a problem concerning the correction of drawing positions may occur not only in the process of making TMR devices, but also in manufacturing processes utilizing electron beam lithography, i.e., processes requiring superfine processing. An example of such manufacturing processes is a step of making the upper magnetic pole of a recording head equipped with an induction type magnetoresistive device. Since the upper magnetic pole acts as an element defining the recording width of MR heads, it is necessary for the upper magnetic pole to have a narrow width in order to increase the track density. Another example of processes employing electron beam lithography is the making of a process monitoring device known as RLG (Resistance Lapping Guide) disposed in parallel with an MR device in order to adjust the MR height.

Namely, objects must be irradiated with electron beams after the drawing positions are accurately corrected in the making of the upper magnetic pole and the process monitoring device for adjusting the MR height as well.

For overcoming the problems mentioned above, it is an object of the present invention to provide a method of making a thin-film magnetic head which can accurately correct drawing positions in electron beam lithography, a method of making a magnetoresistive device assembly, a method of making a head gimbal assembly, a method of making a hard disk drive, and a magnetoresistive device assembly.

For achieving the above-mentioned object, the inventors sought after a reason why electron beam drawing positions cannot be corrected accurately. The following reason has been found as a result. First, a method of making a thin-film magnetic head will be explained in brief. Usually, a plurality of thin-film magnetic heads are made from a single wafer-like substrate. As schematically shown in FIG. 26, such a substrate typically comprises a support 101 made of AlTiC ($Al_2O_3$.TiC), for example, having a surface formed with an undercoat layer 102 made of an insulating material such as alumina ($Al_2O_3$), for example.

Laminated on the undercoat layer 102 is a lower shield layer 103 made of Permalloy (NiFe), for example, for blocking unnecessary external magnetic fields. The lower shield layer 103 is formed with an appropriate gap from its neighboring lower shield layer 103. Further laminated on each shield layer 103 is a nonmagnetic, electrically conductive lower gap layer 104 made of NiCr, Au, Ta, Cu, Al, or the like, for example.

Subsequently, the forming of a TMR film 110 on each lower gap layer 104 begins. Though not depicted, the TMR film 110 has a laminate structure comprising a free layer made of Fe, Co, Ni, or the like; a tunnel barrier layer, made of $Al_2O_3$ or the like, transmitting a tunnel current therethrough; a pinned layer yielding a constant magnetization direction regardless of external magnetic fields; and a pinning layer for fixing the magnetization direction of the pinned layer. Preferably, a cap layer made of Ta, NiCr, or the like, for example, for preventing the TMR film from oxidizing is formed on the pinning layer. Then, thus laminated TMR film 110 is subjected to electron beam lithography so as to define a narrow track width on the lower gap layer 104.

FIG. 26 is a schematic view showing the process of subjecting the TMR film 110 to electron beam lithography. When starting the electron beam lithography, the TMR film 110 is initially etched so as to form an alignment mark 105.

Thereafter, the whole surface of the substrate is coated with an electron beam resist 111. Used here is a negative type resist whose part irradiated with a drawing electron beam becomes hard to dissolve in a developing solution and thus will remain as a resist layer. Subsequently, the alignment mark 105 is irradiated with a position correcting electron beam, and the electron beam irradiation position is corrected for the subsequent step of patterning the TMR film 110.

At thus corrected irradiation position, the electron beam resist 111 is irradiated with a drawing electron beam, and is subjected to postbaking, developing, and so forth, so as to form a resist layer with a desirable pattern on the lower gap layer 104. Then, ion milling or the like utilizing the resist layer as a mask etches the TMR film 110 into a desirable pattern.

However, the inventors have found that, when scanning the alignment mark 105 with the position correcting electron beam, electric charges of the emitted electron beam are stored in the alignment mark 105 as schematically shown in FIG. 26. Namely, since the undercoat layer 102 formed from an insulating material exists under the TMR film 110, the electric charges stored in the TMR film 110 cannot escape to the outside, thereby causing so-called "charge-up".

When irradiating the alignment mark 105 with electron beams, such charge-up inhibits negatively charged electron beams from advancing straightforward due to a repulsive force as indicated by arrows in FIG. 26, which lowers the accuracy in measuring the position of alignment mark 105, thus failing to attain an accurate correction factor for the drawing electron beam irradiation position.

Under such a background, the inventors have accomplished the present invention as follows:

The present invention provides a method of making a thin-film magnetic head equipped with a magnetoresistive device having a magnetoresistive film, the method comprising the steps of forming a multilayer film to become the magnetoresistive film on a substrate having an electrically insulating surface; forming an alignment mark, electrically connected to the multilayer film, for correcting a drawing position of a drawing electron beam; coating the multilayer film with an electron beam resist; irradiating the alignment mark with a position correcting electron beam so as to correct the drawing position; irradiating the electron beam resist with the drawing electron beam at the corrected drawing position so as to form a resist layer with a desirable pattern; and forming the multilayer film into the magnetoresistive film with a desirable pattern by utilizing the resist layer.

In the method of making a thin-film magnetic head in accordance with this aspect of the present invention, the alignment mark is electrically connected to the multilayer film. Therefore, when the alignment mark is irradiated with a position correcting electron beam in order to correct the drawing position in the subsequent step of electron beam lithography, electric charges of the electron beam flow into the multilayer film without staying in the alignment mark. As a consequence, the position correcting electron beam irradiating the alignment mark does not lose its straightforwardness, whereby the drawing position in electron beam lithography can be corrected accurately. Hence, the multilayer film can be formed into a magnetoresistive film with a desirable pattern.

This aspect of the present invention may further comprise the step of forming an electrically conductive base film in a region to be formed with the alignment mark in the substrate before forming the multilayer film, whereas the multilayer film is formed so as to cover the base film in the step of forming the multilayer film, and a periphery of a part to become the alignment mark in the multilayer film is etched until the base film is exposed in the step of forming the alignment mark so as to form the alignment mark.

Electric charges of the position correcting electron beam irradiating the alignment mark flow into the multilayer film through the base film. On the other hand, the alignment mark contains the multilayer film. If the multilayer film and base film are made of respective materials different from each other when determining the substrate position according to the intensity of reflected electrons at the alignment mark or the like, the intensity of occurring reflected electrons will vary between the alignment mark and its surrounding base film, thus making it easier to determine the position.

Preferably, in this case, the thin-film magnetic head further comprises a first shield layer made of a soft magnetic material between the magnetoresistive film and the substrate, and a second shield film made of a soft magnetic material disposed on a side of the magnetoresistive film opposite from the first shield layer, whereas the first shield layer and the base film made of the same material as that of the first shield layer are formed before the step of forming the multilayer film.

When the first shield layer and the base film are made of the same material, they can be formed together, whereby the manufacturing process can be simplified.

In this aspect of the present invention, the step of forming the alignment mark may be configured such that the alignment mark having an electric conductivity is laminated, on a side of the multilayer film opposite from the substrate, at a position excluding a region to be formed with the magnetoresistive film.

Even when employing a method in which the alignment mark is attached to the multilayer film as such, electric charges of the position correcting electron beam irradiating the alignment mark can be caused to flow into the multilayer film through the base film.

Preferably, in this aspect of the present invention, the alignment mark is irradiated with the position correcting electron beam after an electrically conductive member is brought into contact with the multilayer film.

In this case, electric charges stored in the alignment mark before the irradiation with the position correcting electron beam can be lead to the outside by way of the multilayer film and electrically conductive member. After the electrically conductive member is brought into contact with the multilayer film, the alignment mark may be irradiated with electrons while keeping the contact state, whereby electric charges stored in the alignment mark at the time of irradiation can be led to the outside by way of the multilayer film and electrically conductive member. This prevents the position correcting electron beam from losing its straightforwardness, whereby the drawing position in electron beam lithography can be corrected accurately.

The present invention provides a method of making a magnetoresistive device assembly equipped with a plurality of magnetoresistive devices each having a magnetoresistive film, the method comprising the steps of forming a multilayer film to become the magnetoresistive film on a substrate having an electrically insulating surface; forming an alignment mark, electrically connected to the multilayer film, for correcting a drawing position of a drawing electron beam; coating the multilayer film with an electron beam resist; irradiating the alignment mark with a position correcting electron beam so as to correct the drawing position; irradiating the electron beam resist with the drawing electron beam at the corrected drawing position so as to form a resist layer with a desirable pattern; and forming the multilayer film into the magnetoresistive film with a desirable pattern by utilizing the resist layer.

When the alignment mark is irradiated with the position correcting electron beam in the method of making a magnetoresistive device assembly in accordance with this aspect of the present invention, electric charges of the electron beam flow into the multilayer film without staying in the alignment mark. Therefore, the position correcting electron beam irradiating the alignment mark does not lose its straightforwardness, whereby the drawing position in electron beam lithography can be corrected accurately. Here, the magnetoresistive device assembly encompasses a wafer formed with a plurality of magnetoresistive devices, a bar into which the wafer is divided, and the like.

The method of making a magnetoresistive device assembly in accordance with this aspect of the present invention may comprise the step of forming an electrically conductive base film in a region to be formed with the alignment mark in the substrate before forming the multilayer film, whereas the multilayer film is formed so as to cover the base film in the step of forming the multilayer film, and a periphery of a part to become the alignment mark in the multilayer film is etched until the base film is exposed in the step of forming the alignment mark so as to form the alignment mark.

Electric charges of the position correcting electron beam irradiating the alignment mark flow into the multilayer film through the base film. On the other hand, the alignment mark contains the multilayer film. If the multilayer film and base film are made of respective materials different from each other when determining the substrate position by measuring the intensity of reflected electrons at the alignment mark or the like, the intensity of occurring reflected electrons will vary between the alignment mark and its surrounding base film, thus making it easier to determine the position.

In the method of making a magnetoresistive device assembly in accordance with this aspect of the present invention, the step of forming the alignment mark may be configured such that the alignment mark having an electric conductivity is laminated, on a side of the multilayer film opposite from the substrate, at a position excluding a region to be formed with the magnetoresistive film.

Even when employing a method in which the alignment mark is attached to the multilayer film as such, electric charges of the position correcting electron beam irradiating the alignment mark can be caused to flow into the multilayer film through the base film.

The present invention provides a method of making a magnetic head slider equipped with a thin-film magnetic head having a magnetoresistive film, the method comprising the steps of forming a multilayer film to become the magnetoresistive film on a substrate having an electrically insulating surface; forming an alignment mark, electrically connected to the multilayer film, for correcting a drawing position of a drawing electron beam; coating the multilayer film with an electron beam resist; irradiating the alignment mark with a position correcting electron beam so as to correct the drawing position; irradiating the electron beam resist with the drawing electron beam at the corrected drawing position so as to form a resist layer with a desirable pattern; forming the multilayer film into the magnetoresistive film with a desirable pattern by utilizing the resist layer; and cutting the substrate so as to form a magnetic head slider having the magnetoresistive film.

When the alignment mark is irradiated with the position correcting electron beam in the method of making a magnetic head slider in accordance with this aspect of the present invention, electric charges of the electron beam flow into the multilayer film without staying in the alignment mark. Therefore, the position correcting electron beam irradiating the alignment mark does not lose its straightforwardness, whereby the drawing position in electron beam lithography can be corrected accurately.

The present invention provides a method of making a head gimbal assembly equipped with a thin-film magnetic head having a magnetoresistive film, the method comprising the steps of forming a multilayer film to become the magnetoresistive film on a substrate having an electrically insulating surface; forming an alignment mark, electrically connected to the multilayer film, for correcting a drawing position of a drawing electron beam; coating the multilayer film with an electron beam resist; irradiating the alignment mark with a position correcting electron beam so as to correct the drawing position; irradiating the electron beam resist with the drawing electron beam at the corrected drawing position so as to form a resist layer with a desirable pattern; forming the multilayer film into the magnetoresistive film with a desirable pattern by utilizing the resist layer; cutting the substrate so as to form a magnetic head slider having the magnetoresistive film; and mounting the magnetic head slider to gimbals.

When the alignment mark is irradiated with the position correcting electron beam in the method of making a head gimbal assembly in accordance with this aspect of the present invention, electric charges of the electron beam flow into the multilayer film without staying in the alignment mark. Therefore, the position correcting electron beam irradiating the alignment mark does not lose its straightforwardness, whereby the drawing position in electron beam lithography can be corrected accurately. As a consequence, the head gimbal assembly made by way of such a process can form tracks of magnetoresistive films at desirable positions and yield a narrow track width at a high dimensional accuracy, thereby attaining a high magnetic information reproducing performance.

The present invention provides a method of making a hard disk drive equipped with a thin-filmmagnetic head having a magnetoresistive film, the method comprising the steps of forming a multilayer film to become the magnetoresistive film on a substrate having an electrically insulating surface; forming an alignment mark, electrically connected to the multilayer film, for correcting a drawing position of a drawing electron beam; coating the multilayer film with an electron beam resist; irradiating the alignment mark with a position correcting electron beam so as to correct the drawing position; irradiating the electron beam resist with the drawing electron beam at the corrected drawing position so as to form a resist layer with a desirable pattern; forming the multilayer film into the magnetoresistive film with a desirable pattern by utilizing the resist layer; cutting the substrate so as to form a magnetic head slider having the magnetoresistive film; mounting the magnetic head slider to gimbals so as to prepare a head gimbal assembly; and assembling the head gimbal assembly such that the magnetic head slider thereof is movable above a hard disk adapted to record a magnetic signal.

When the alignment mark is irradiated with the position correcting electron beam in the method of making a hard disk drive in accordance with this aspect of the present invention, electric charges of the electron beam flow into the multilayer film without staying in the alignment mark. Therefore, the position correcting electron beam irradiating the alignment mark does not lose its straightforwardness, whereby the drawing position in electron beam lithography can be corrected accurately. As a consequence, the hard disk drive made by way of such a process can form tracks of magnetoresistive films at desirable positions and yield a narrow track width at a high dimensional accuracy, thereby attaining a high areal density.

The present invention provides a method of making a thin-film magnetic head equipped with a magnetoresistive device having a magnetoresistive film, the method comprising the steps of forming the magnetoresistive film on a substrate having an electrically insulating surface; and forming a process monitoring device having an ohmic value related to an MR height of the magnetoresistive device; the step of forming the process monitoring device including substeps of forming the substrate with a resistance film to become the process monitoring device; forming an alignment mark, electrically connected to the resistance film, for correcting a drawing position of a drawing electron beam; coating the resistance film with an electron beam resist; irradiating the alignment mark with a position correcting electron beam so as to correct the drawing position; irradiating the electron beam resist with the drawing electron beam at the corrected drawing position so as to form a resist layer with a desirable pattern; and forming the resistance film into a desirable pattern by utilizing the resist layer so as to form the process monitoring device.

In the method of making a thin-film magnetic head in accordance with this aspect of the present invention, the resistance film, which will later become a process monitoring device, and the alignment mark are electrically connected to each other. Therefore, when the alignment mark is irradiated with a position correcting electron beam in order to correct the drawing position in the subsequent step of electron beam lithography, electric charges of the electron beam flow into the resistance film without staying in the alignment mark. As a consequence, the position correcting electron beam irradiating the alignment mark does not lose its straightforwardness, whereby the drawing position in electron beam lithography can be corrected accurately. Hence, the resistance film can be formed into a desirable pattern, whereby a high-performance process monitoring device can be formed.

This aspect of the present invention may comprise the substep of forming an electrically conductive base film in a region to be formed with the alignment mark in the substrate before forming the resistance film, whereas the resistance film is formed so as to cover the base film in the substep of forming the resistance film, and a periphery of a part to become the alignment mark in the resistance film is etched until the base film is exposed in the substep of forming the alignment mark so as to form the alignment mark.

Electric charges of the position correcting electron beam irradiating the alignment mark flow into the resistance film through the base film. On the other hand, the alignment mark contains the resistance film. If the resistance film and base film are made of respective materials different from each other when determining the substrate position by measuring the intensity of reflected electrons at the alignment mark or the like, the intensity of occurring reflected electrons will vary between the alignment mark and its surrounding base film, thus making it easier to determine the position.

In this aspect of the present invention, the substep of forming the alignment mark may be configured such that the alignment mark having an electric conductivity is laminated, on a side of the resistance film opposite from the substrate, at a position excluding a region to be formed with the process monitoring device. Even when employing a method in which the alignment mark is attached to the resistance film as such, electric charges of the position correcting electron beam irradiating the alignment mark can be caused to flow into the resistance film through the base film.

Preferably, in this aspect of the present invention, the alignment mark is irradiated with the position correcting electron beam after an electrically conductive member is brought into contact with the resistance film. In this case, electric charges stored in the alignment mark before the irradiation with the position correcting electron beam can be lead to the outside by way of the resistance film and electrically conductive member. After the electrically conductive member is brought into contact with the resistance film, the alignment mark may be irradiated with electrons while keeping the contact state, whereby electric charges stored in the alignment mark at the time of irradiation can be led to the outside by way of the resistance film and electrically conductive member. This prevents the position correcting electron beam from losing its straightforwardness, whereby the drawing position in electron beam lithography can be corrected accurately.

The present invention provides a method of making a thin-film magnetic head having an induction type recording magnetic transducer, the method comprising the steps of forming a substrate with a first magnetic pole and a second magnetic pole magnetically connected to the first magnetic pole with at least a recording gap layer held therebetween; the step of forming the second magnetic pole including the substeps of forming an electrically conductive magnetic film to become the second magnetic pole; partly removing the magnetic film so as to form an alignment mark for correcting a drawing position of a drawing electron beam; coating the magnetic film with an electron beam resist; irradiating the alignment mark with a position correcting electron beam so as to correct the drawing position; irradiating the electron beam resist with the drawing electron beam at the corrected drawing position so as to form a resist layer with a desirable pattern; and forming the magnetic film into the second magnetic pole with a desirable pattern by utilizing the resist layer.

In the method of making a thin-film magnetic head in accordance with this aspect of the present invention, the electrically conductive magnetic film to become the second magnetic pole is partly removed, so as to form an alignment mark. Therefore, when the alignment mark is irradiated with a position correcting electron beam, electric charges of the electron beam flow into the magnetic film without staying in the alignment mark. As a consequence, the position correcting electron beam irradiating the alignment mark does not lose its straightforwardness, whereby the drawing position in electron beam lithography can be corrected accurately. Hence, the magnetic film can be formed into the second magnetic pole with a desirable pattern.

Preferably, in this aspect of the present invention, the alignment mark is irradiated with the position correcting electron beam after an electrically conductive member is brought into contact with the magnetic film. In this case, electric charges stored in the alignment mark before the irradiation with the position correcting electron beam can be lead to the outside by way of the magnetic film and electrically conductive member. After the electrically conductive member is brought into contact with the magnetic film, the alignment mark may be irradiated with electrons while keeping the contact state, whereby electric charges stored in the alignment mark at the time of irradiation can be led to the outside by way of the magnetic film and electrically conductive member. This prevents the position correcting electron beam from losing its straightforwardness, whereby the drawing position in electron beam lithography can be corrected accurately.

The present invention provides a method of making a thin-film magnetic head having an induction type recording magnetic transducer, the method comprising the steps of forming a substrate with a first magnetic pole and a second magnetic pole magnetically connected to the first magnetic pole with at least a recording gap layer held therebetween; the step of forming the second magnetic pole including the substeps of forming a plating electrode such that a plurality of forming positions to be formed with the second magnetic pole are electrically connected to each other; forming the plating electrode with an alignment mark for correcting a drawing position of a drawing electron beam; coating the plating electrode with an electron beam resist; irradiating the alignment mark with a position correcting electron beam so as to correct the drawing position; irradiating the electron beam resist with the drawing electron beam at the corrected drawing position so as to form a resist layer with a desirable pattern; and carrying out plating by utilizing the resist layer so as to form the second magnetic pole with a desirable pattern on the plating electrode.

In the method of making a thin-film magnetic head in accordance with this aspect of the present invention, the electrically conductive plating electrode is formed with an alignment mark. Therefore, when the alignment mark is irradiated with a position correcting electron beam, electric charges of the electron beam flow into the plating electrode without staying in the alignment mark. As a consequence, the position correcting electron beam irradiating the alignment mark does not lose its straightforwardness, whereby the drawing position in electron beam lithography can be corrected accurately. Hence, the second magnetic pole with a desirable pattern can be formed on the plating electrode.

The present invention provides a magnetoresistive device assembly equipped with a plurality of magnetoresistive devices each having a magnetoresistive film, the magnetoresistive device assembly comprising a substrate having an electrically insulating surface; the magnetoresistive film formed on the substrate; an alignment mark formed on the substrate, a position of the alignment mark being corrected with an electron beam; and an electrically conductive layer electrically connected to the alignment mark; wherein the electrically conductive layer and the magnetoresistive film are obtained from the same electrically conductive multilayer film.

In the magnetoresistive device assembly in accordance with this aspect of the present invention, the alignment mark has been electrically connected to a multilayer film which is a source of the electrically conductive layer and magnetoresistive film. When the alignment mark is irradiated with a position correcting electron beam in the process of making the assembly for correcting the drawing position in the subsequent step of electron beam lithography, electric charges of the electron beam flow into the multilayer film without staying in the alignment mark. As a consequence, the position correcting electron beam irradiating the alignment mark does not lose its straightforwardness, whereby the drawing position in electron beam lithography can be corrected accurately. Hence, the magnetoresistive film obtained from the multilayer film attains a high positional accuracy.

The present invention provides a magnetoresistive device assembly equipped with a plurality of magnetoresistive devices each having a magnetoresistive film, the magnetoresistive device assembly comprising a substrate having an electrically insulating surface; the magnetoresistive film formed on the substrate; an alignment mark formed on the substrate, a position of the alignment mark being corrected with an electron beam; and an electrically conductive layer electrically connected to the alignment mark; wherein the electrically conductive layer and the magnetoresistive film have the same laminate pattern.

In such a magnetoresistive device assembly, the electrically conductive layer and magnetoresistive film can be obtained from the same multilayer film. In this case, the alignment mark has been electrically connected to the multilayer film that is a source of the electrically conductive layer and magnetoresistive film. When the alignment mark is irradiated with a position correcting electron beam in the process of making the assembly for correcting the drawing position in the subsequent step of electron beam lithography, electric charges of the electron beam flow into the multilayer film without staying in the alignment mark. As a consequence, the position correcting electron beam irradiating the alignment mark does not lose its straightforwardness, whereby the drawing position in electron beam lithography can be corrected accurately. Hence, the magnetoresistive film obtained from the multilayer film attains a high positional accuracy.

BRIEF DESCRIPTION OF THE DRAWINGS

The present invention may be more readily described with reference to the accompanying drawings, in which:

FIG. 17 is a sectional view taken along the line XVII—XVII of FIG. 11 showing a state formed with a recording gap layer, a thin-film coil, and the like;

FIG. 24A is a perspective view showing a substrate formed with a plurality of thin-film magnetic heads 10, whereas

FIG. 26 is a view used for explaining a reason why an electron beam irradiating an alignment mark loses its straightforwardness, which has been found by the inventors in the process of accomplishing the present invention.

DESCRIPTION OF THE PREFERRED EMBODIMENTS

In the following, with reference to the accompanying drawings, preferred embodiments of the present invention will be explained in detail. Constituents identical to each other will be referred to with numerals identical to each other without repeating their overlapping explanations.

First, before explaining the manufacturing method of this embodiment, outlines of a thin-film magnetic head, a head gimbal assembly, and a hard disk drive which are obtained by this method will be explained with reference to FIGS. 1 to 4.

Figure 1:
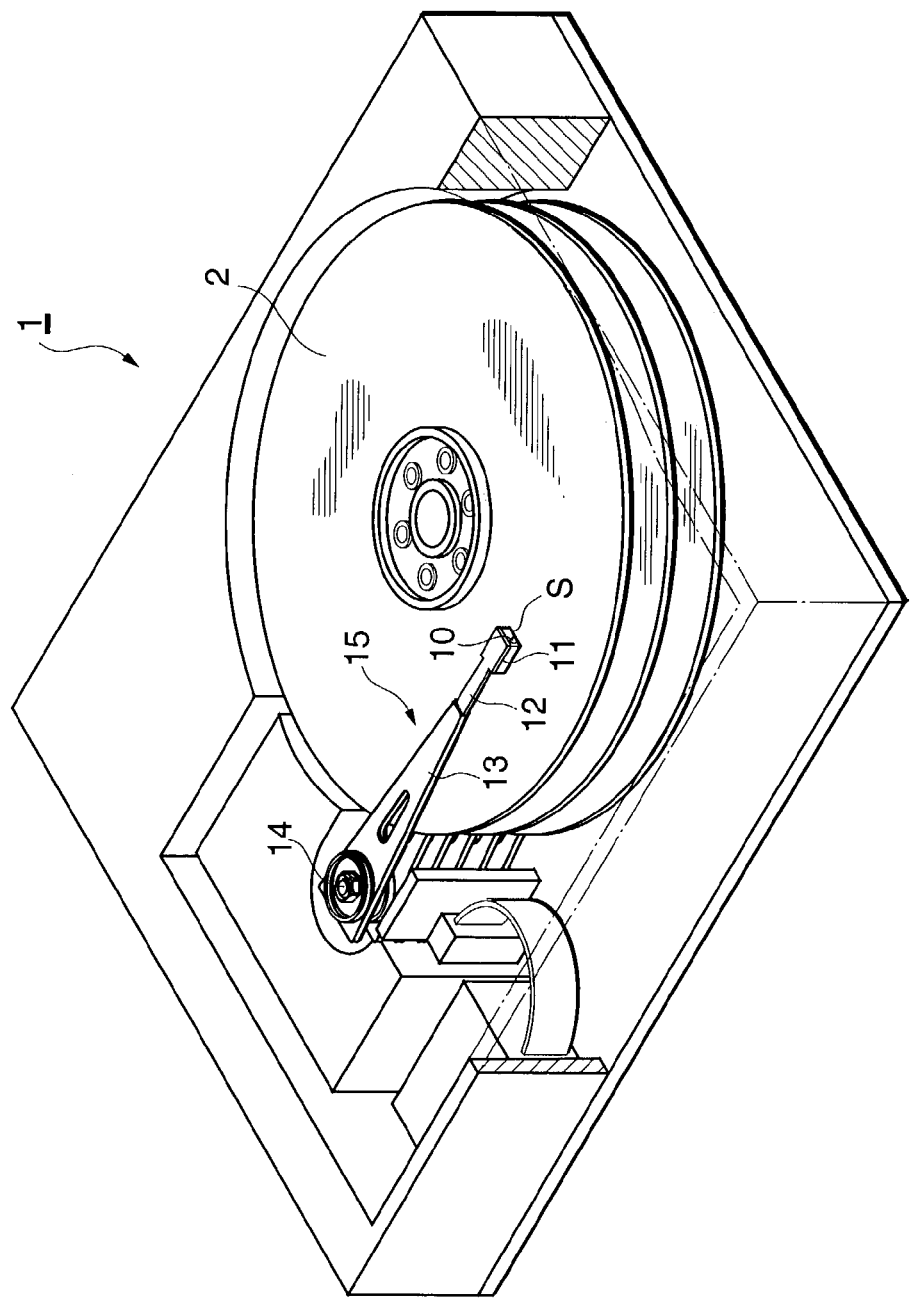
FIG. 1 is a perspective view showing an embodiment of hard disk drive made in accordance with the present invention.

FIG. 1 is a view showing a hard disk drive equipped with a thin-film magnetic head obtained by the manufacturing method of this embodiment. This hard disk drive 1 actuates a head gimbal assembly (HGA) 15, and uses a thin-film-magnetic head 10 for recording and reproducing magnetic information on a recording surface (upper face in FIG. 1) of a hard disk 2 rotating at a high speed. The head gimbal assembly 15 comprises gimbals 12 mounting a slider (magnetic head slider) 11 formed with the thin-film magnetic head 10, and a suspension arm 13 connected thereto, and is rotatable about a shaft 14 by a voice coil motor, for example. As the head gimbal assembly 15 is rotated, the slider 11 moves in a radial direction of the hard disk 2, i.e., in a direction traversing track lines.

Figure 2:
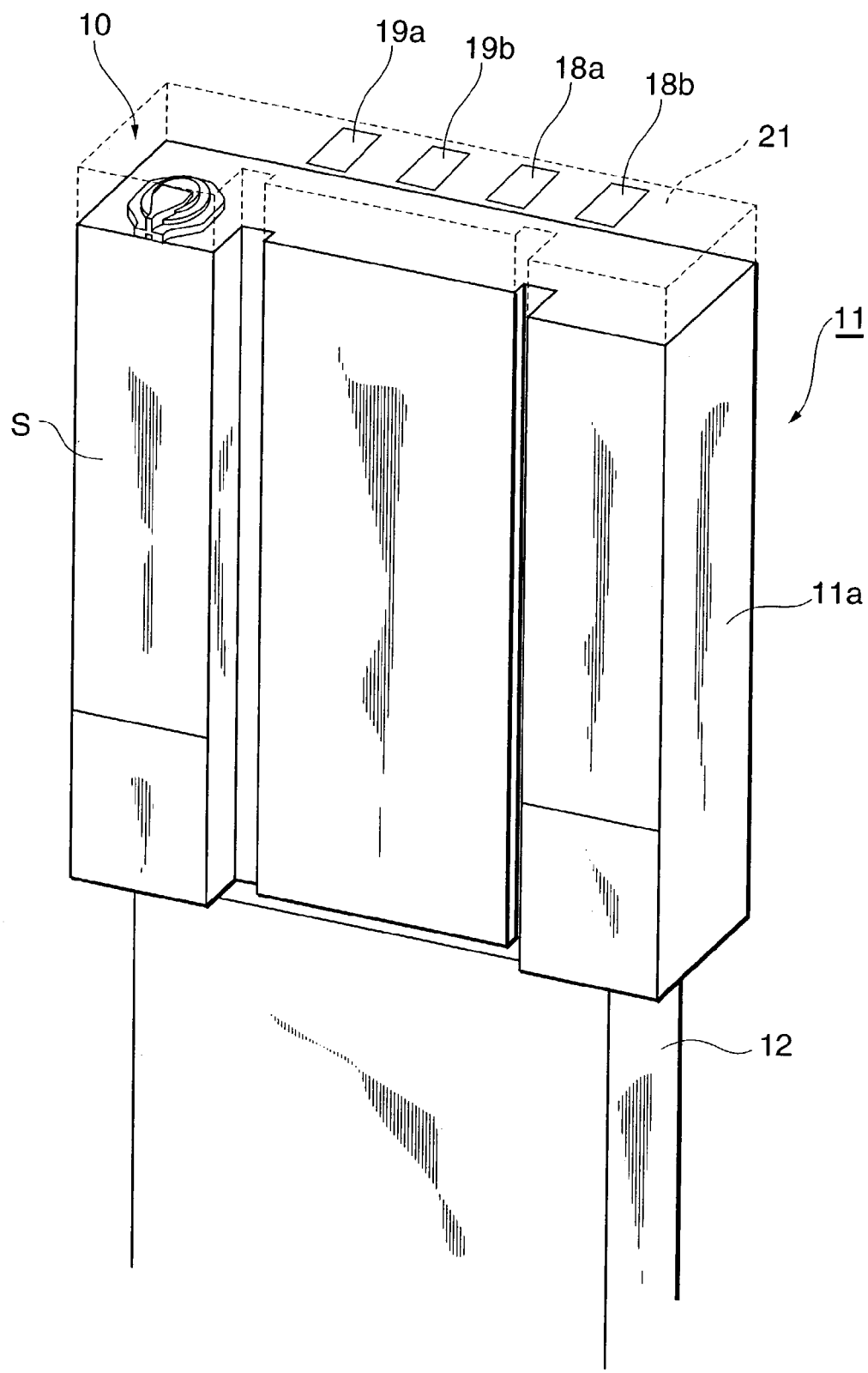
FIG. 2 is a perspective view showing a magnetic head slider.

FIG. 2 is an enlarged view of the slider 11. In the slider 11, the thin-film magnetic head 10 is formed on a support 11a, made of AlTiC ($Al_2O_3 \cdot TiC$), having a substantially rectangular parallelepiped shape. The front-side face in the drawing is a surface facing the recording surface of the hard disk 2 and is referred to as an air bearing surface (ABS) S.

When the hard disk 2 rotates, the airflow caused by the rotation floats the slider 11, thereby separating the air bearing surface S from the recording surface of the hard disk 2. The thin-film magnetic head 10 is provided with recording pads 18a, 18b and reproducing pads 19a, 19b; whereas wires (not depicted), connected to the respective pads, for inputting/outputting electric signals are attached to the suspension arm 13 shown in FIG. 1. Also provided is an overcoat layer 21, indicated by broken lines in the drawing, for protecting the thin-film magnetic head 10. The air bearing surface S may be coated with DLC (Diamond Like Carbon) or the like.

Figure 3:
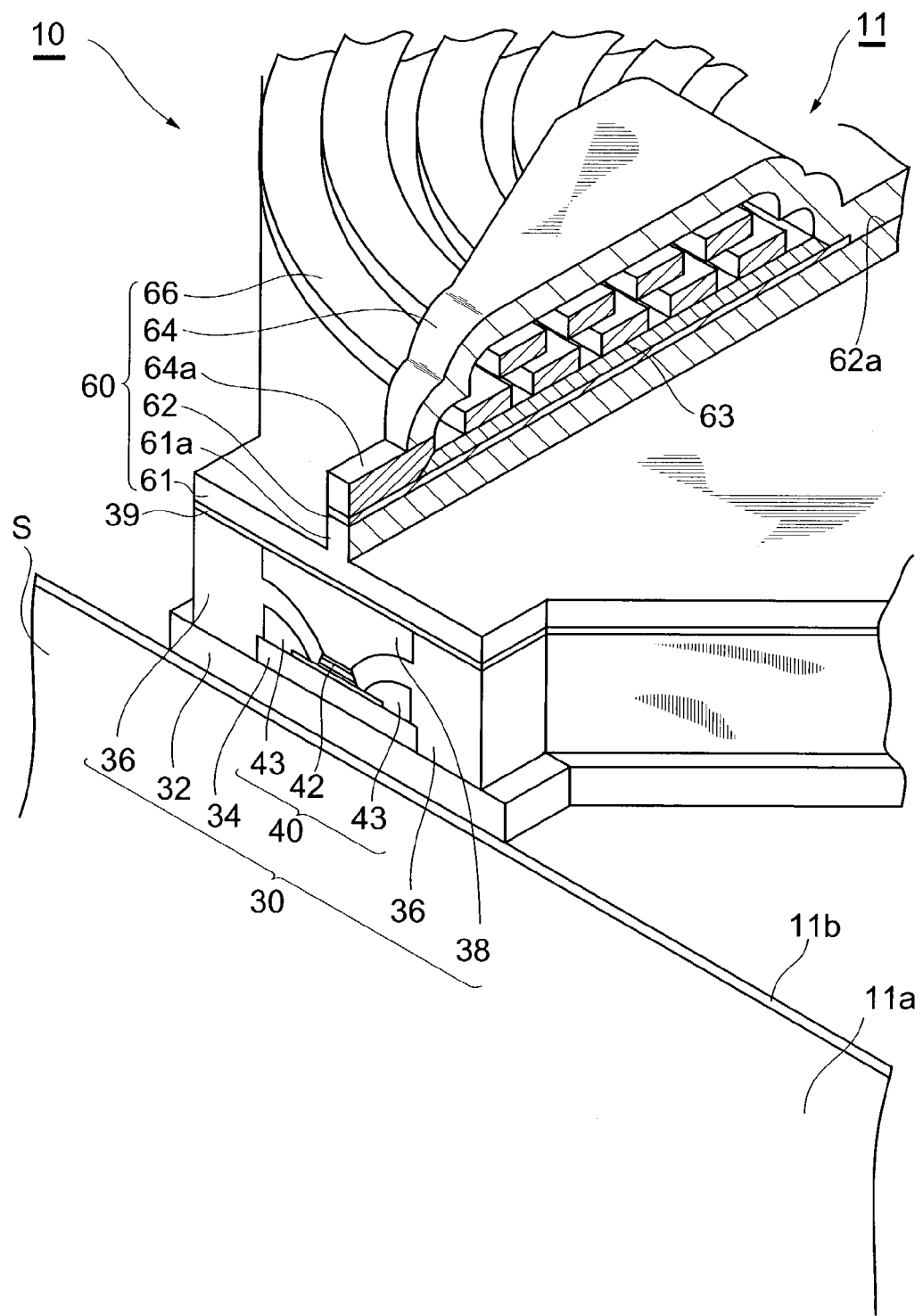
FIG. 3 is an enlarged view of a thin-film magnetic head and its vicinity in FIG. 2.

FIG. 3 is an enlarged view schematically showing the thin-film magnetic head 10 formed in the slider 11. For explaining its outlines, the thin-film magnetic head 10 is shown in this drawing in a partly broken state, while omitting layers which will not be mentioned. On the support 11a, an undercoat layer 11b made of an electrically insulating material such as alumina ($Al_2O_3$) is formed, on which the thin-film magnetic head 10 is formed.

The thin-film magnetic head 10 is a combination thin-film magnetic head in which a reproducing head section 30 having a TMR device as a magnetoresistive device and a recording head section 60 as an induction type magnetic transducer are combined together. The TMR device employs a TMR film utilizing a tunnel effect and yielding a magnetoresistance change ratio higher than that of GMR films.

The reproducing head section 30 mainly comprises a lower shield layer (first shield layer) 32 also acting as a lower electrode; a lower gap layer 34 formed from a nonmagnetic, electrically conductive material; a TMR device 40; insulating layers 36 disposed on both sides thereof; and an upper shield layer (second shield layer) 38, formed on the TMR device 40, also acting as an upper electrode. The lower gap layer 34 is used for adjusting the lead gap corresponding to the recording density of a recording medium to a desirable value. The lower shield layer 32 and upper shield layer 38 function to prevent the TMR device from sensing unnecessary external magnetic fields. The TMR device 40 has a TMR film 42 and magnetic bias application layers 43 which are disposed on both sides thereof and made of a hard magnet or the like, for example. Though not depicted, the lower shield layer 32 (lower electrode) and the upper shield layer 38 (upper electrode) are electrically connected to the reproducing pads 19a and 19b (see FIG. 2), respectively. In the specification, words "upper" and "lower" used as in the shield layers refer to the sides closer to and further from the support 11a, respectively.

Figure 4:
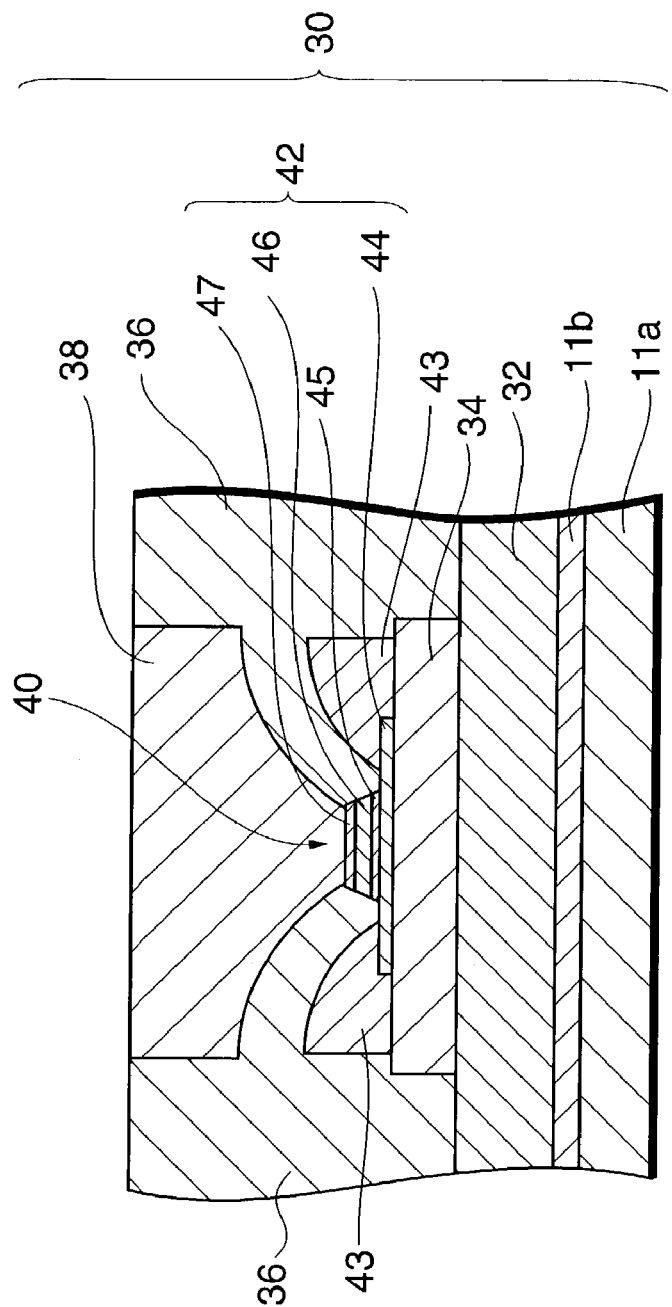
FIG. 4 is a sectional view of a TMR device and its vicinity.

FIG. 4 is a sectional view of the TMR device 40 and its vicinity at a location slightly inside of the air bearing surface S in the vertical direction. The TMR film 42 of the TMR device 40 comprises a free layer 44 containing a ferromagnetic material, whose magnetization direction is variable according to external magnetic fields; a tunnel barrier layer 45 which is a nonmagnetic, insulating, thin film through which electrons can pass while maintaining their spins due to a tunnel effect; a pinned layer 46 containing a ferromagnetic material, whose magnetization direction is held constant without being affected by external magnetic fields; and a pinning layer 47 for fixing the magnetization direction (depth direction of the drawing sheet) of the pinned layer 46. Preferably, a cap layer made of Ta, NiCr, or the like, for example, for preventing the TMR film from oxidizing is formed on the pinning layer 47. The magnetic bias application layers 43 apply a bias magnetic field to the free layer 44 of the TMR film 42 in horizontal directions in FIG. 4.

In the following manner, such are producing head section 30 reproduces magnetic information recorded in the hard disk 2. Namely, when a voltage is applied between the reproducing pads 19a, 19b (see FIG. 2), electrons flow from the pinned layer 46 into the free layer 44 through the tunnel barrier layer 45, which is an insulating layer. As mentioned above, the magnetization direction of the free layer 44 is changeable by external magnetization, i.e., magnetization of the hard disk 2. The ohmic value becomes lower when the respective magnetization directions of the pinned layer 46 and free layer 44 are parallel to each other, and becomes higher when they are not parallel. Utilizing these phenomena, the magnetic information recorded in the hard disk 2 is read out according to the relative angle between the respective magnetization directions of the free layer 44 and pinned layer 46.

Referring to FIG. 3 again, the recording head section 60 of the thin-film magnetic head 10 will be explained. The recording head section 60 is disposed on the reproducing head section 30 by way of an insulating layer 39, and acts as an induction type magnetic transducer. The insulating layer 39 is not always necessary. The recording head section 60 mainly comprises a lower magnetic layer 61; a lower magnetic pole (first magnetic pole) 61a formed by partly trimming the lower magnetic layer 61; a recording gap layer 62 made of an insulating material; an upper magnetic pole (second magnetic pole) 64a formed on the recording gap layer 62 and magnetically connected to the lower magnetic pole 61a (lower magnetic layer 61) by way of an upper magnetic layer 64; and a plurality of thin-film coils 66. Though the processes of preparing the upper magnetic pole 64a and the upper magnetic layer 64 are separated from each other in this example, they may be made at once by the same process. The recording gap layer 62 is formed with an opening 62a at the center part of the thin-film coils 66, whereby the upper magnetic pole 64a and the lower magnetic pole 61a are magnetically connected to each other through the opening 62a. The recording pads 18a, 18b (see FIG. 2) are electrically connected to the thin-film coils 66.

In the following manner, such a recording head section 60 records information onto the hard disk 2. Namely, when a recording current is caused to flow through the thin-film coils 66 by way of the recording pads 18a, 18b, a magnetic field occurs between the lower magnetic pole 61a and upper magnetic pole 64a. Then, a magnetic flux occurring near the recording gap layer 62 magnetizes the hard disk 2, thereby recording the information.

The foregoing are outlines of the thin-film magnetic head, head gimbal assembly, and hard disk drive obtained by the manufacturing method of this embodiment. With reference to FIGS. 5 to 25, the manufacturing method of this embodiment will now be explained.

Figure 5:
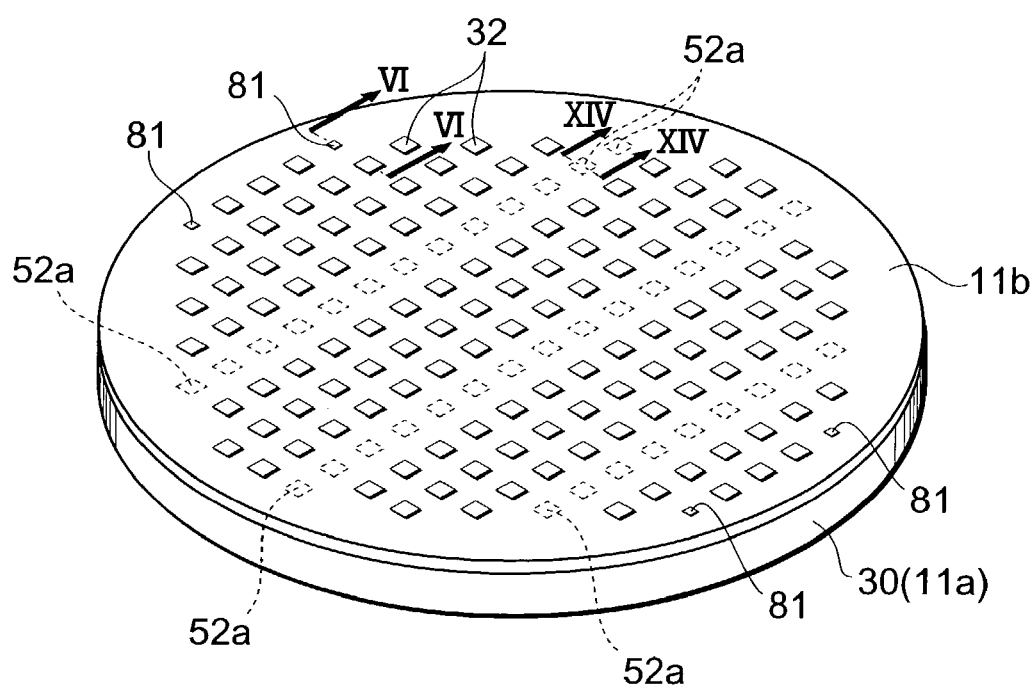
FIG. 5 is a perspective view showing a substrate formed with a plurality of lower shield layers.

The making of the thin-film magnetic head 10 is carried out by a procedure in which the part corresponding to the reproducing head section 30 is prepared and then the part corresponding to the recording head section 60 is prepared. First, as shown in FIG. 5, an undercoat layer 11b made of an insulating material such as alumina ($Al_2O_3$), for example, is formed by a thickness of about 1 µm to about 10 µm by sputtering on a wafer-like substrate 30 made of AlTiC ($Al_2O_3$.TiC), for example, so as to form an electrically insulating substrate. The substrate 30 becomes a support 11a for the slider 11 in a later step. Though only the surface of the substrate requires an electrically insulating property, a substrate made of an insulating material as a whole may be used as well. Subsequently, on the undercoat layer 11b, a lower shield layer 32 made of a soft magnetic material such as NiFe (Permalloy) is formed by a thickness of about 1 µm to about 3 µm by plating, for example. Also, as shown in the same drawing, the lower shield layer 32 is formed at each of matrix-like forming positions where TMR devices 40 will be formed later.

By the same material (e.g., NiFe) as that of the lower shield layer 32, an electrically conductive base film 81 is formed in a region to be formed with an alignment mark which will be explained later. As with the lower shield layer 32, the base film 81 can be formed by plating or the like. Then, the part other than those formed with the base film 81 and lower shield layer 32 is buried under an insulating layer 11c such as alumina ($Al_2O_3$) until its surface level is on a par with that of the lower shield layer 32 (see FIG. 6). Regions 52a indicated by broken lines in FIG. 5 illustrate positions of process monitoring devices which will be provided later. A process monitoring device is formed for each or a predetermined number of reproducing heads. The lower shield layer 32 is formed with spaces for providing the process monitoring devices.

Figure 6:
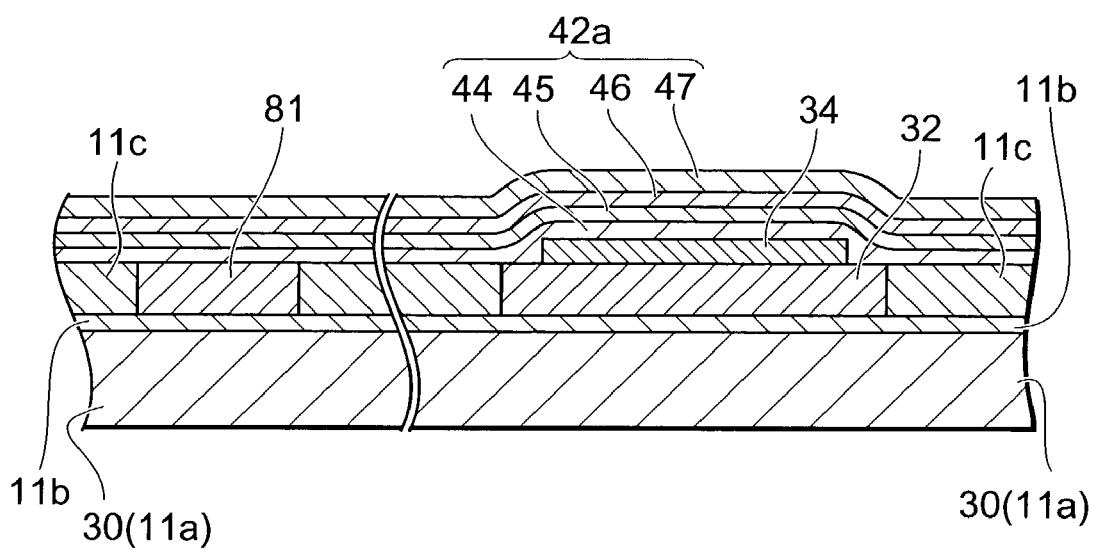
FIG. 6 is a view showing a state where a lower shield layer, a base layer, and a multilayer film are formed on an insulating substrate.

Referring to FIG. 6, the next step will be explained. FIG. 6 is a sectional view taken along the line VI-VI in FIG. 5. A lower gap layer 34 is formed by a thickness of about 1 nm to about 70 nm on the lower shield layer 32, for example, by sputtering. Examples of materials forming the lower gap layer 34 include Cu, Al, Au, Ta, and NiCr.

Subsequently, a multilayer film 42a is formed on substantially the whole surface of the substrate 30 so as to cover the lower gap layer 34 and base film 81. The multilayer film 42a will later be patterned into a TMR film 42. Specifically, a free layer 44, a tunnel barrier layer 45, a pinned layer 46, and a pinning layer 47 are laminated in this order, for example, by sputtering. Preferably, a cap layer for preventing the TMR film 42 from oxidizing is formed on the pinning layer 47. The free layer 44 has a thickness of about 1 nm to about 10 nm and can be formed from a ferromagnetic material such as NiFe or CoFe. The tunnel barrier layer 45 has a thickness of about 0.5 nm to about 2 nm and can be formed from an insulating material such as $Al_2O_3$, NiO, MgO, or $TiO_2$, for example. An example of techniques for forming the tunnel barrier layer 45 from $Al_2O_3$ comprises the steps of forming a film of Al on the free layer 44 and then oxidizing thus formed film. The pinned layer 46 has a thickness of about 1 nm to about 10 nm and can be formed from a ferromagnetic material such as Fe, Co, Ni, or CoFe. The pinning layer 47 has a thickness of about 5 nm to about 30 nm and can be formed from an anti ferromagnetic material such as PtMn, for example, which can fix the magnetization direction of the pinned layer 46.

Figure 7:
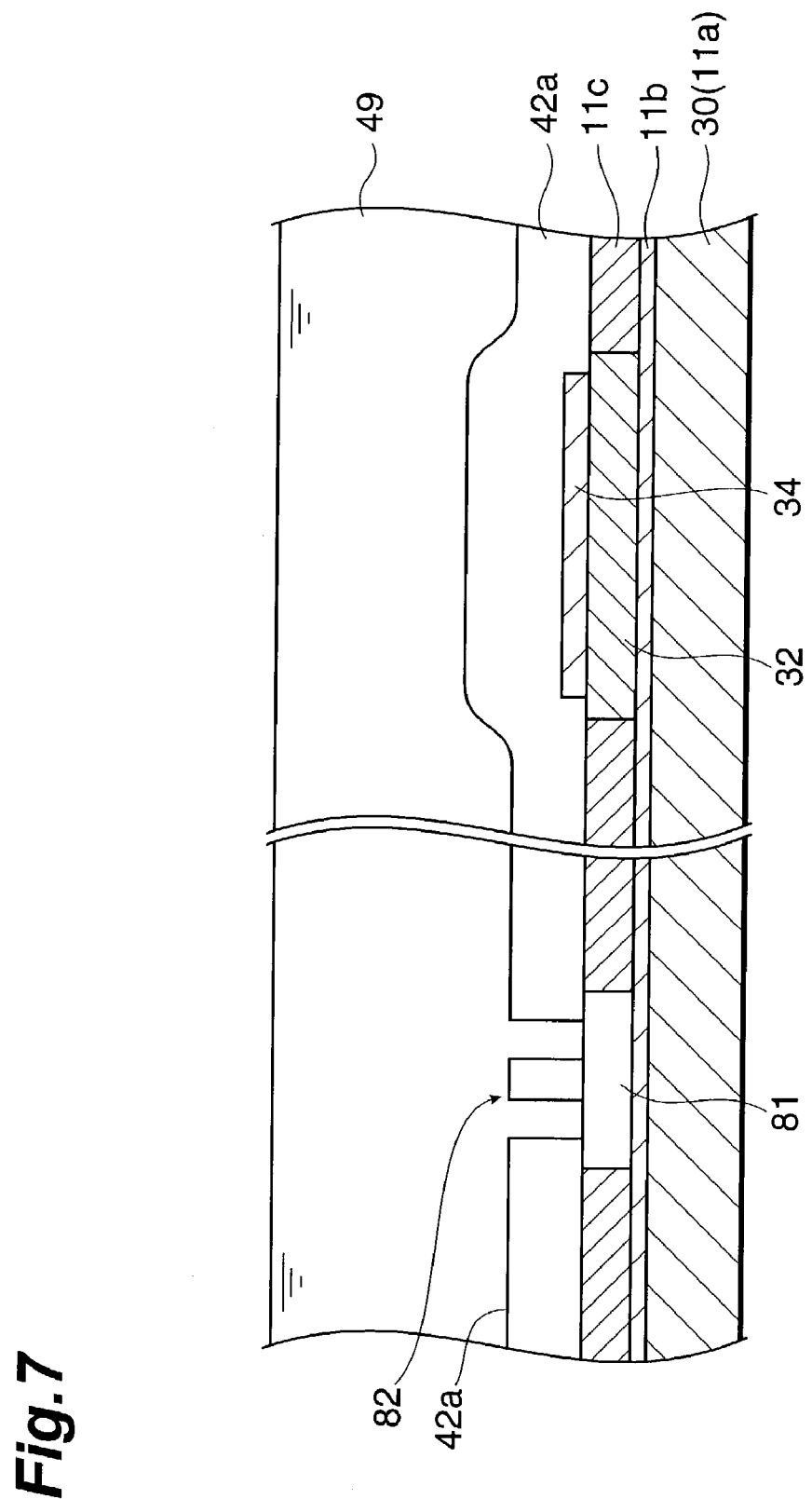
FIG. 7 is a view showing a state where an alignment mark is coated with an electron beam resist after being formed.

Next, as shown in FIG. 7, surroundings of the part to become an alignment mark in the multilayer film 42a are etched (for which ion milling, RIE, and the like are usable) until the base film 81 is exposed, so as to form the alignment mark 82. The form of alignment mark 82 is variable without being restricted to the depicted one. In this drawing, the individual layers of the multilayer film 42a are not depicted, whereas the cross section is not completely hatched (thus yielding a schematic view). The alignment mark 82 is formed from the material of the multilayer film 42a, and thus has an electric conductivity. The alignment mark 82 is formed such that the contact part between the base film 81 and multilayer film 42a is left. As a consequence, the alignment mark 82 is electrically connected to the multilayer film 42a by way of the base film 81. After forming such an alignment mark 82, an electron beam resist 49 is applied onto the multilayer film 42a (on the side opposite from the substrate 30) so as to cover the whole surface of the substrate 30. Here, the electron beam resist 49 is of negative type whose part irradiated with an electron beam will remain as a resist layer. Though this embodiment uses a chemically amplified resist, other kinds of electron beam resists can be employed as well.

Figure 8:
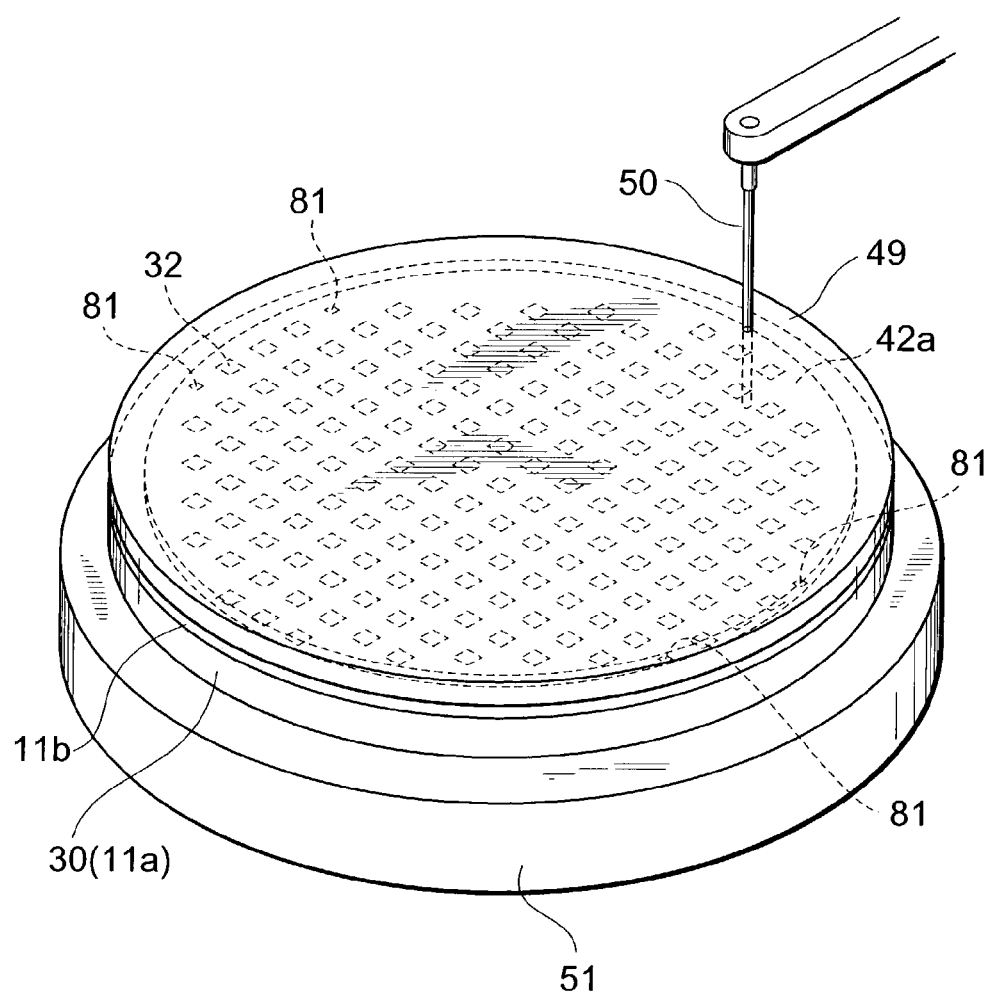
FIG. 8 is a view showing a state where an earth pin (electrically conductive member) is inserted into a multilayer film prior to irradiation with a position correcting electron beam.

Before irradiating the alignment mark with a position correcting electron beam, this embodiment takes the following step. Namely, as shown in FIG. 8, the front end part of an electrically conductive earth pin (electrically conductive member) 50 having the grounded potential, made of Cu, for example, provided in an electron beam drawing apparatus is inserted into the multilayer film 42a of the substrate 30 supported by a susceptor 51. In this embodiment, the earth pin 50 is inserted near the outer periphery of the substrate 30. When the earth pin 50 is inserted into the multilayer film 42a as such, electric charges stored in the multilayer film 42a and alignment mark 82 in various steps so far flow out through the earth pin 50.

Figure 9:
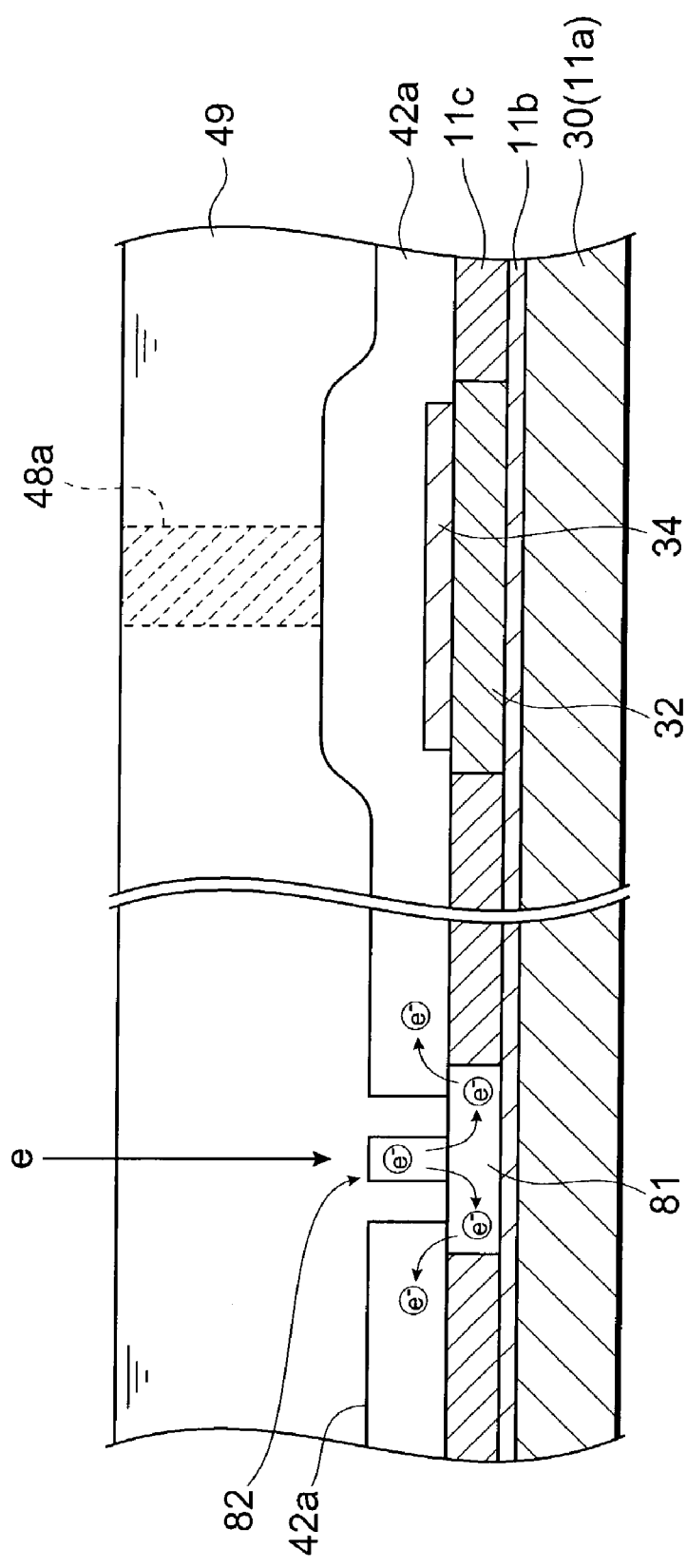
FIG. 9 is a view showing a state where the alignment mark is irradiated with the position correcting electron beam.

Subsequently, for correcting a drawing position in a later step, the alignment mark 82 of the substrate 30 is initially scanned with the position correcting electron beam as shown in FIG. 9, and the intensity of reflected electrons occurring at this time is measured. After the position of the alignment mark 82 is detected according to the intensity of reflected electrons, the position of an optical system irradiating a drawing electron beam in the subsequent step or the position of a stage supporting the substrate is corrected according to thus detected position.

In this embodiment, the alignment mark 82 is electrically connected to the multilayer film 42a by way of the base film 81. Therefore, when the alignment mark 82 is irradiated with the position correcting electron beam as schematically indicated by an arrow in FIG. 9, electric charges of the electron beam flow into the multilayer film 42a without staying in the alignment mark 82. As a consequence, the position correcting electron beam irradiating the alignment mark 82 does not lose its straightforwardness, whereby drawing positions in electron beam lithography can be corrected accurately. Hence, the multilayer film 42a can be formed into the TMR film 42 with a desirable pattern in the subsequent step.

Also, since the earth pin 50 is inserted in the multilayer film 42a as shown in FIG. 8, electric charges stored in the alignment mark 82 at the time of irradiation with the position correcting electron beam move from the multilayer film 42a to the outside through the earth pin 50, whereby electric charges can more reliably be prevented from causing charge-up in the alignment mark 82. Here, the electrically conductive member for moving electric charges of the TMR film 42 to the outside can be changed into various forms without being restricted to the needle-like earth pin 50. For example, it is not always required to be pointed, although a pointed electrically conductive member is preferred for making it easier to be inserted into the multilayer film 42a. Also, electric charges can be moved to the outside of the multilayer film 42a if the earth pin 50 is brought into contact with the surface of the multilayer film 42a even without inserting it to the inside.

In this embodiment, the alignment mark 82 is formed on the base film 81, whereas the base film 81 is exposed in the periphery of the alignment mark 82. The baser film 81 is made of the same material (e.g., NiFe) as that of the lower shield layer 32. The alignment mark 82 is constituted by the same material as that of the multilayer film 42a. The uppermost pinned layer is made of PtMn, which is an antiferromagnetic material. In the case where the alignment mark 82 and the base film 81 are formed from respective materials different from each other as such, the intensity of reflected electrons occurring in the alignment mark 82 differs from that of reflected electrons occurring in its surrounding base film 81 when the alignment mark 82 and its vicinity are scanned with the position correcting electron beam for positional correction, whereby positional measurement becomes easier. The base film 81 may also be formed so as to be laminated on the insulating layer 11c instead of being surrounded thereby. Even in the latter case, electric charges of the position correcting electron beam irradiating the alignment mark 82 flow into the multilayer film 42a through the base film 81.

Since the base film 81 is formed from the same material as that of the lower shield layer 82, they can be formed together by plating, for example, whereby the manufacturing process can be simplified in this embodiment.

After the correction of drawing position of drawing electron beam is completed, a desirable area on the lower gap layer 34 in the electron beam resist 49 is irradiated with a drawing electron beam from an electron gun (not depicted), so as to form a latent image pattern 48a (region hatched with broken lines in the drawing). Here, the drawing electron beam may be either identical to or different from the position correcting electron beam outputted from the electron gun used for irradiating the alignment mark. Thereafter, post-exposure baking is carried out, and then a developing solution is used, so as to attain a resist layer 48 with a desirable pattern.

Figure 10:
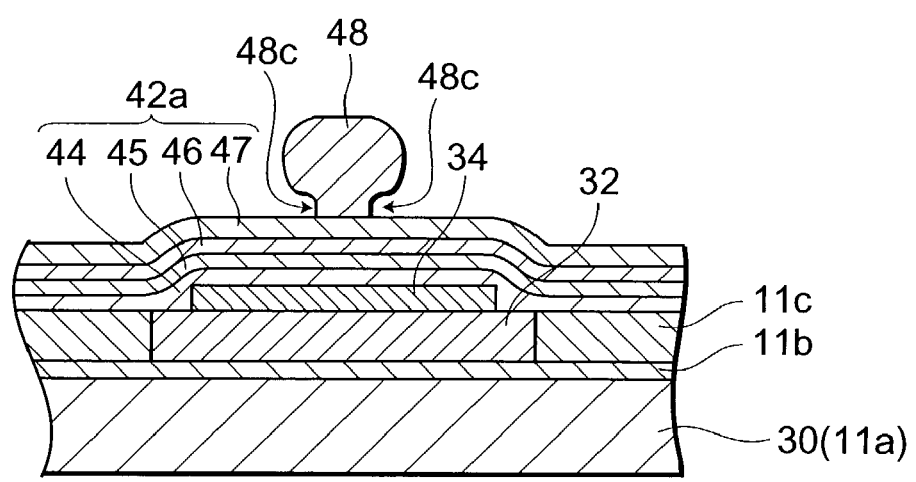
FIG. 10 is a view showing a state where a resist layer is formed by baking after an electron beam resist is irradiated with a drawing electron beam.

FIG. 10 is a view showing the laminate structure after the development. As depicted, the resist layer 48 is formed with undercuts 48c on both sides of its lower part. Forming such undercuts 48c facilitates liftoff which will be performed later. The undercuts 48c can be formed, for example, by coating the multilayer film 42a with a layer of polymethylglutarimide (PMGI) having a low molecular weight and then applying an electron beam resist onto this layer as disclosed in Japanese Patent Publication No. HEI 7-6058.

Figure 11:
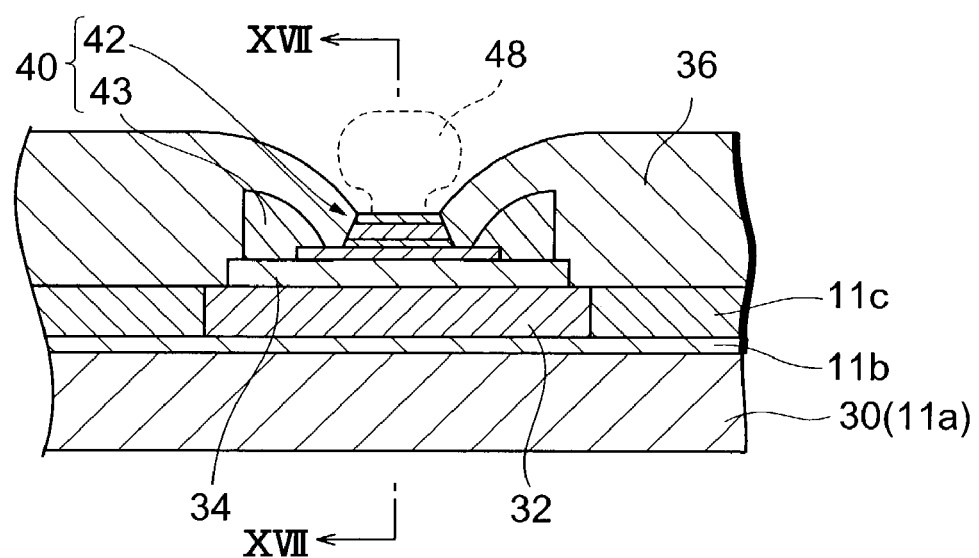
FIG. 11 is a view showing a state where liftoff is carried out after forming an insulating layer on a magnetic bias application layer.

Referring to FIG. 11, the next step will be explained. First, using the resist layer 48 as a mask, the multilayer film 42a is selectively etched by ion milling or the like, for example, so as to form a TMR film 42 with a desirable minute pattern. Thereafter, a pair of magnetic bias application layers 43 are formed on both sides of the TMR film 42 by sputtering, for example, so as to yield a TMR device 40. The magnetic bias application layers 43 are formed from a high-coercivity material such as CoPt, for example. Then, an insulating layer 36 made of $Al_2O_3$ or the like is formed by sputtering, for example, so as to cover the lower shield layer 32, lower gap layer 34, and magnetic bias application layers 43. In FIGS. 3 and 4, the insulating layers 11c and 36 are collectively referred to as the insulating layer 36 since they are formed from the same material (alumina).

Thereafter, liftoff is carried out with a release liquid, so as to remove the resist layer 48 together with the materials laminated thereon. An alternative process may comprise the steps of forming a resist layer having a desirable pattern by using a positive type electron beam resist while leaving the vicinity of the part to be formed with the TMR film 42; forming a metal oxide film, for example, by sputtering or the like on the resist layer and the part not covered with the resist layer; and then etching the multilayer film 42a while using the metal oxide film with the desirable pattern obtained by liftoff as a mask. Such a process can also form the TMR film 42 by using the resist layer. Further, an upper shield layer 38 made of a soft magnetic material is formed by plating, for example, so as to cover the TMR film 42 and insulating layer 36. An example of materials forming the upper shield layer 38 is NiFe or the like. The state formed with the upper shield layer 38 is as shown in FIG. 4. Here, using a known through hole forming technique or the like, the lower shield layer 32 (lower electrode) and the upper shield layer 38 (upper electrode) are electrically connected to the reproducing pads 19a and 19b (see FIG. 2), respectively. The foregoing process yields a part to function as the reproducing head section 30 of a thin-film magnetic head.

Figure 12:
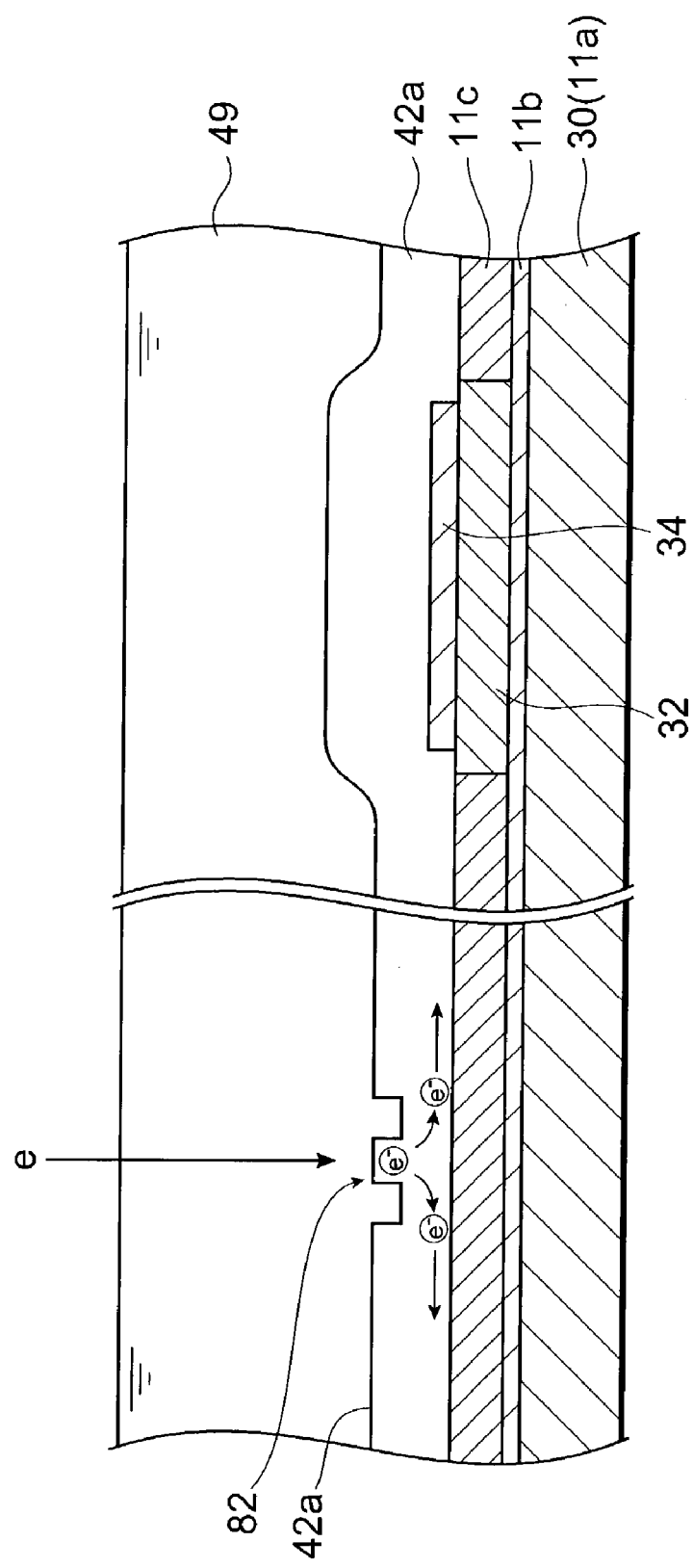
FIG. 12 is a view showing another technique of forming an alignment mark.

With reference to FIG. 12, another embodiment in accordance with the present invention will be explained. In this embodiment, without forming the base film 81, the multilayer film 42a is partly eliminated in its depth direction instead of being etched to the bottom, so as to form an alignment mark 82. Even in the case employing such a configuration, electric charges of a position correcting electron beam irradiating the alignment mark 82 flow into the multilayer film 42a without staying within the mark. Therefore, the position correcting electron beam does not lose its straightforwardness, whereby drawing positions in electron beam lithography can be corrected accurately.

Figure 13:
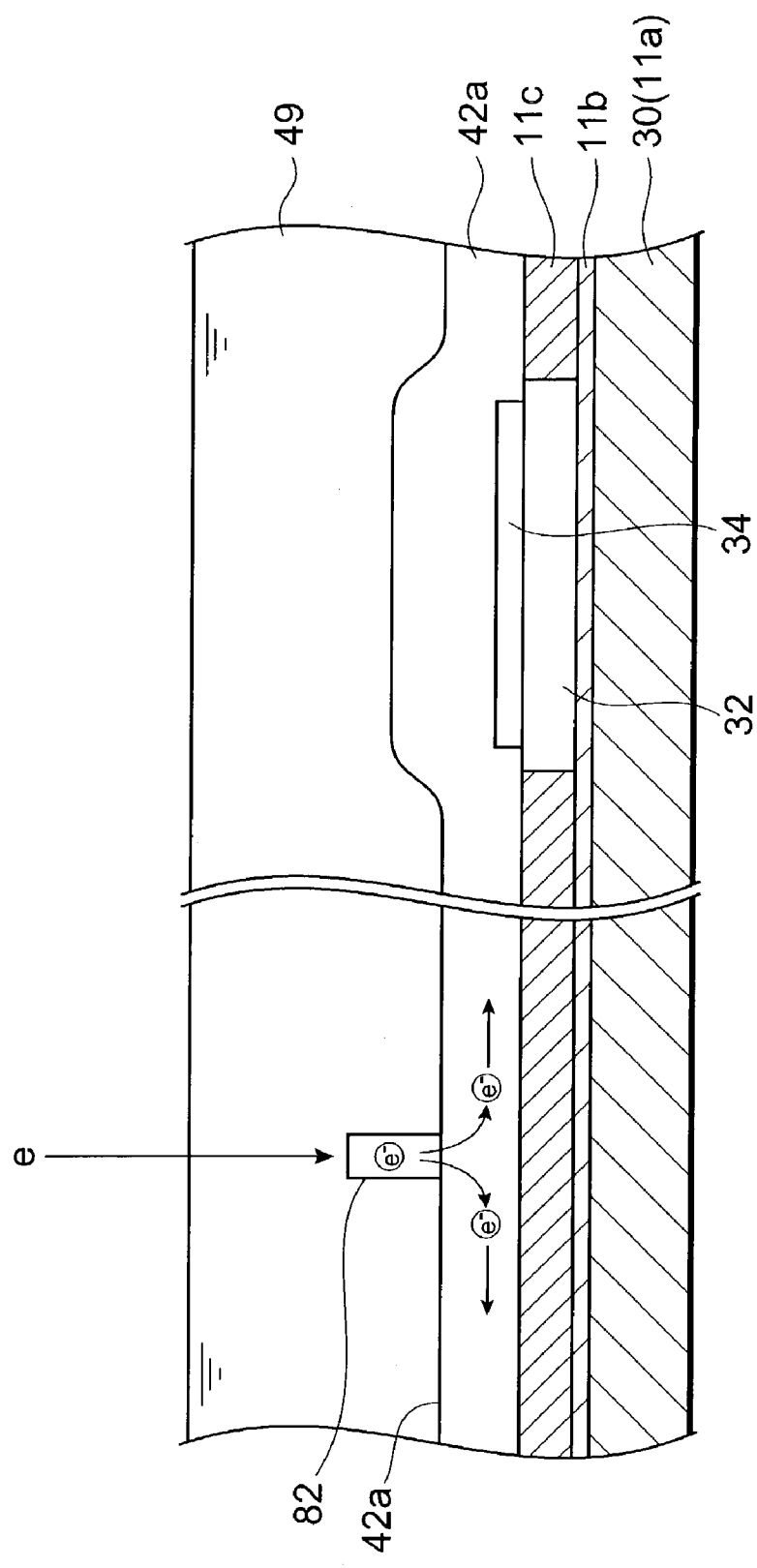
FIG. 13 is a view showing still another technique of forming an alignment mark.

With reference to FIG. 13, still another embodiment will be explained. In this embodiment, instead of forming an alignment mark by etching the multilayer film 42a, an electrically conductive alignment mark 82 is laminated on the multilayer film 42a (on the side opposite from the substrate 30) at a position other than the region to be formed with the TMR film 42. The alignment mark can be formed from a material such as Ta, for example, by a method such as sputtering. Even in the case employing such a configuration, the alignment mark 82 is electrically connected to the multilayer film 42a, whereby electric charges of a position correcting electron beam irradiating the alignment mark 82 flow into the multilayer film 42a without staying within the mark. Alternatively, the alignment mark 82 may be formed on the insulating layer 11c, so as to be covered with the multilayer film 42a. Even in such a configuration, the position correcting electron beam passes through the multilayer film 42a, whereby the position of alignment mark 82 can be detected. Also, since the alignment mark 82 is electrically connected to the multilayer film 42a, electric charges of the position correcting electron beam irradiating the alignment mark 82 can be caused to flow into the multilayer film 42a.

Though each of the above-mentioned embodiments explains a combination thin-film magnetic head comprising the reproducing head section 30 and the recording head section 60, position correcting electron beams irradiating an alignment mark can keep their straightforwardness even in a read-only head not equipped with the recording head section 60 when any of the above-mentioned methods is employed therein.

Figure 14:
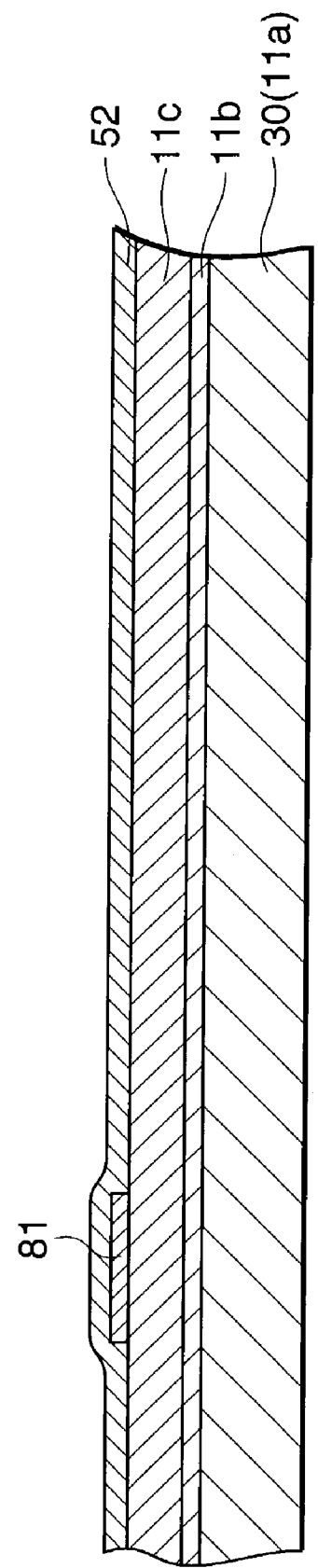
FIG. 14 is a view showing a state where a resistance film to become a part of a process monitoring device, and a base film are formed on a substrate.
Figure 15:
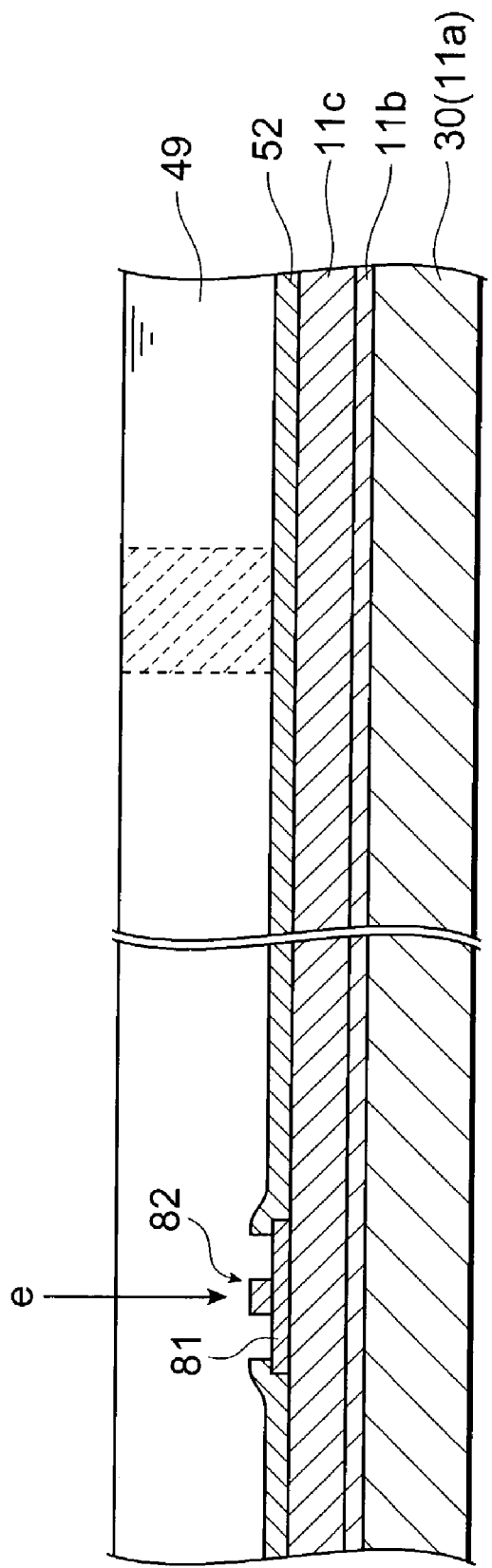
FIG. 15 is a view showing a state where the resistance film is etched, so as to form an alignment mark.
Figure 16:
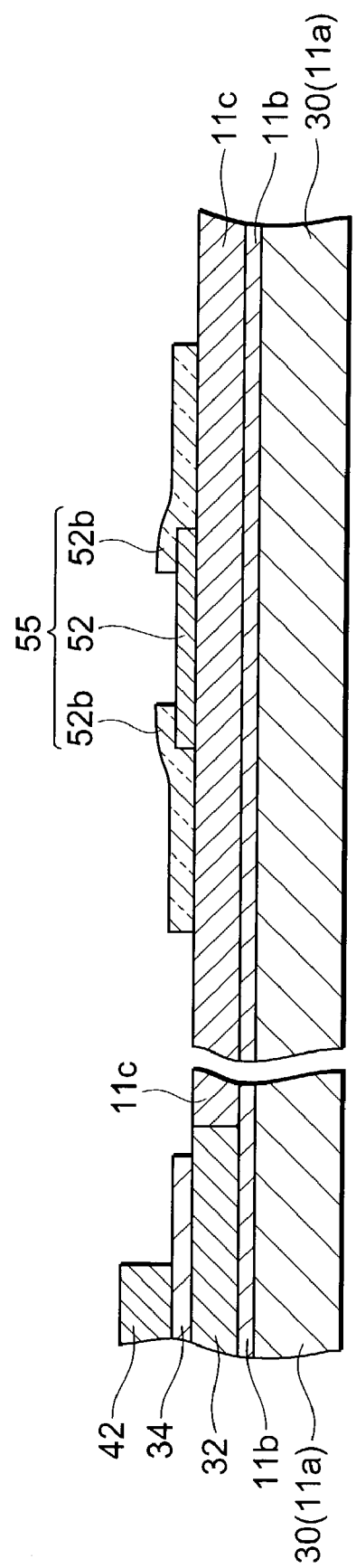
FIG. 16 is a view showing a state where leads are attached to the patterned resistance film, so as to prepare the process monitoring device.

With reference to FIGS. 14 to 16, the forming of a process monitoring device, known as RLG (Resistance Lapping Guide), for adjusting the MR height of each TMR device will now be explained.

In FIG. 5, the process monitoring device is formed in parallel with the lower shield layer 32, e.g., at a position corresponding to a region 52a, on the insulating layer 11c made of alumina provided so as to bury the part other than the positions formed with the lower shield layer 32. Here, the MR height refers to the depth of the TMR device as seen from the air bearing surface S. The process monitoring device may also be referred to as ELG (Electric Lapping Guide) sensor.

FIG. 14 shows a cross section taken along the line XIV—XIV of FIG. 5, illustrating the state where a resistance film 52 to become a part of the process monitoring device is laminated after the base film 81 is formed into the state of FIG. 5. The base film 81 is formed from NiFe, for example. As the resistance film 52, for example, a laminate film of Ta/NiFe/Ta is formed by a thickness of about 20 nm to about 50 nm.

Subsequently, as shown in FIG. 15, a periphery of the region to be formed with an alignment mark in the resistance film 52 is etched (for which ion milling, RIE, and the like are usable) until the base film 81 is exposed, so as to form an alignment mark 82. The alignment mark 82 is formed from the material of the resistance film 52, thus yielding an electric conductivity. Also, the alignment mark 82 is formed so as to leave the contact part between the base film 81 and resistance film 52. As a consequence, the alignment mark 82 is electrically connected to the resistance film 52 by way of the base film 81. After the alignment mark 82 is formed, an electron beam resist 49 is applied onto the resistance film 52 so as to cover the whole surface of the substrate 30. Here, the electron beam resist 49 is of negative type whose part irradiated with a drawing electron beam will remain as a resist layer.

Subsequently, for correcting a drawing position in a later step, the alignment mark 82 of the substrate 30 is initially scanned with a position correcting electron beam as indicated by an arrow in FIG. 15, and the intensity of reflected electrons occurring at this time is measured. After the position of the alignment mark 82 is detected according to the intensity of reflected electrons, the position of an optical system irradiating a drawing electron beam in the subsequent step or the position of a stage supporting the substrate is corrected according to thus detected position.

In this embodiment, the alignment mark 82 is electrically connected to the resistance film 52. Therefore, when the alignment mark 82 is irradiated with the position correcting electron beam, electric charges of the electron beam flow into the resistance film 52 without staying in the alignment mark 82. As a consequence, the position correcting electron beam irradiating the alignment mark 82 does not lose its straightforwardness, whereby drawing positions in electron beam lithography can be corrected accurately. Hence, in the subsequent step, the resistance film 52 can be formed into a desirable pattern, so as to define the width of the process monitoring device accurately.

In this case, the alignment mark 82 may be irradiated with the position correcting electron beam after an earth pin is brought into contact with the resistance film 52 as in the alignment at the time of forming the TMR film 42. As a consequence, electric charges of the position correcting electron beam irradiating the alignment mark 82 can be led to the outside by way of the base film 81, resistance film 52, and earth pin.

After the correction of drawing position of drawing electron beam is completed, a desirable area in the electron beam resist 49 is irradiated with a drawing electron beam from an electron gun (not depicted), so as to form a latent image pattern (region hatched with broken lines in FIG. 15). Thereafter, post-exposure baking is carried out, and then a developing solution is used, so as to attain a resist layer 48 with a desirable pattern.

FIG. 16 shows the state where the unnecessary part of the resistance film is eliminated by milling or the like using the resist layer with the desirable pattern obtained by electron beam irradiation in FIG. 15 as a mask, so as to leave the resistance film 52 with a desirable pattern. An alternative process may comprise the steps of forming a resist layer having a desirable pattern by using a positive type electron beam resist while leaving the vicinity of the part to be formed with the resistance film 52; forming a metal oxide film, for example, by sputtering or the like on the resist layer and the part not covered with the resist layer; and then etching the resistance film 52 while using the metal oxide film with the desirable pattern obtained by liftoff as a mask. Such a process can also form the resistance film 52 by using the resist layer. Extraction electrodes 52b are attached to thus patterned resistance film 52 by a known technique, whereby a process monitoring device 55 is obtained. In the subsequent step, the process monitoring device 55 is covered with an insulating material such as alumina. The foregoing is the process of preparing a process monitoring device.

As in the stage prior to patterning the TMR film 42, the alignment mark 82 may be formed by partly etching the resistance film 52 in the depth direction thereof without providing the base film 81. Also, instead of forming the alignment mark 82 by etching the resistance film 52, an electrically conductive alignment mark 82 electrically connected to the resistance film 52 may be laminated on the resistance film 52. Even in the cases employing these measures, electric charges of the position correcting electron beam flow into the resistance film 52 without staying in the alignment mark 82, whereby the straightforwardness of the position correcting electron beam is not be obstructed.

With reference to FIGS. 17 to 23, the process of making the recording head section 60 will now be explained. The upper magnetic pole 64a (see FIG. 3) can be prepared by either a dry scheme such as sputtering or a wet scheme such as plating, each of which will be explained in the following.

Figure 17:
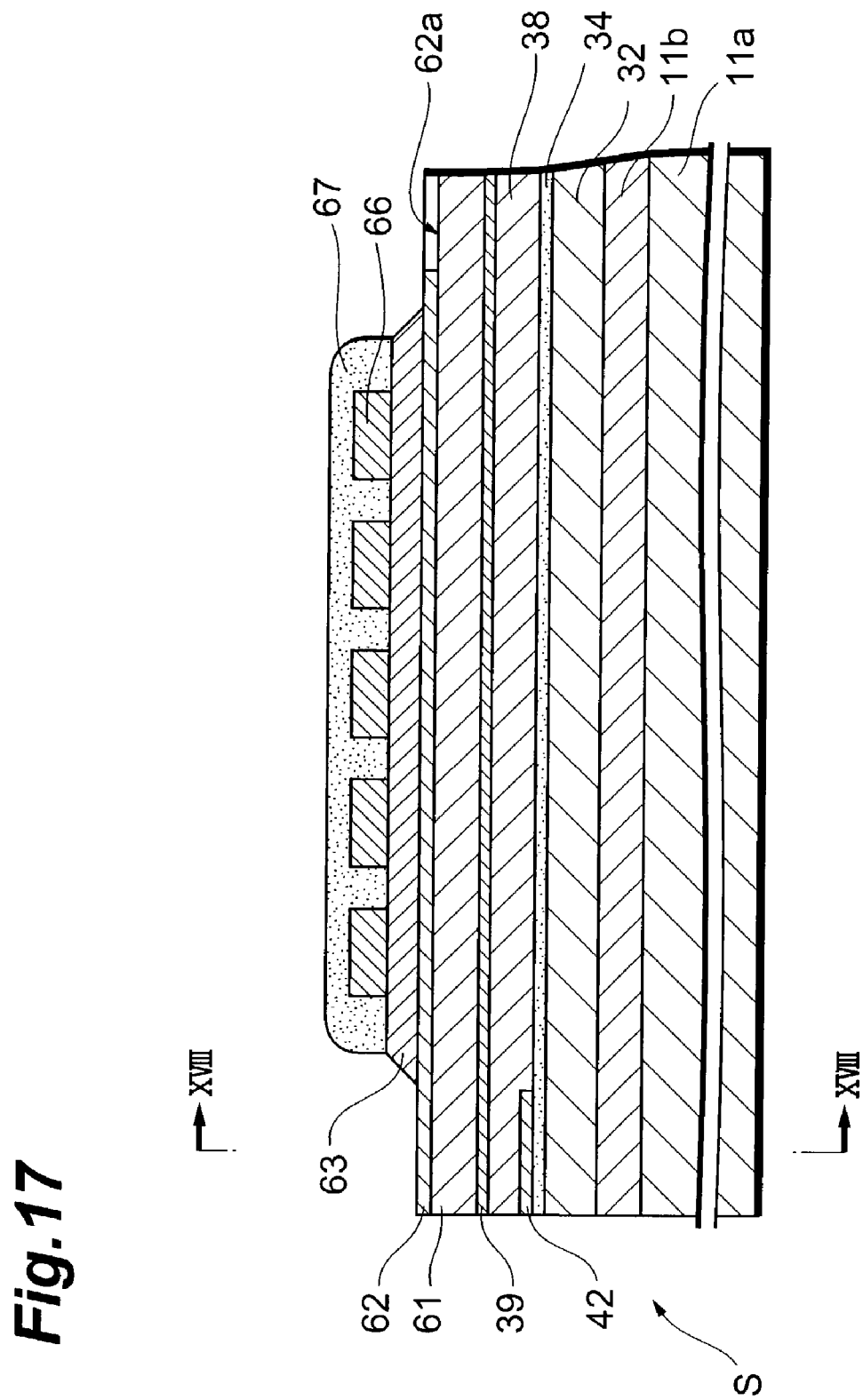

FIG. 17 is a sectional view taken along the line XVII—XVII in FIG. 11 after an upper shield layer 38 is formed on the TMR film 42 and subjected to predetermined steps. Namely, after the upper shield layer 38 is formed into the state of FIG. 11, an insulating layer 39 made of an insulating material such as $Al_2O_3$ is formed thereon by a thickness of about 0.1 μm to about 0.5 μm by sputtering, for example. Subsequently, a lower magnetic layer 61 including a part which will later become a lower magnetic pole 61a of the recording head section 60 (see FIG. 3) is formed on the insulating layer 39. Here, it is not always necessary to provide the insulating layer 39 as mentioned above. Further, a recording gap layer 62 made of an insulating material such as $Al_2O_3$ is formed by a thickness of about 0.05 μm to about 0.5 μm by sputtering, for example, on the lower magnetic layer 61. At this point, the upper part of the recording gap layer 62 and lower magnetic layer 61 near the air bearing surface S has not attained a narrow pattern such as the one shown in FIG. 3, and thus has not formed the lower magnetic pole 61a. The width of the upper shield layer 38 as seen from the air bearing surface S is on a par with that of the lower shield layer 32, whereby an insulating layer is disposed between the respective upper shield layers 38 of adjacent reproducing head sections (see FIG. 18).

On the recording gap layer 62, a photoresist layer 63 is formed by a thickness of about 1.0 μm to about 2.0 μm with a predetermined pattern. Subsequently, a thin-film coil 66 is formed by a thickness of about 1 μm to about 3 μm on the photoresist layer 63, and a photoresist layer 67 is formed on the thin-film coil 66. Also, recording pads 18a, 18b (see FIG. 2) are electrically connected to the thin-film coil 66 by a known method. At the stage of FIG. 17, only one layer of thin-film coil 66 is formed. The process in this example comprises the steps of forming an upper magnetic pole 61a after forming the first layer of thin-film coil 66; forming a second layer of thin-film coil 66 (see FIG. 3) thereafter; etching the recording gap layer 62 at a position corresponding to the center part of the thin-film coil 66 so as to form an opening 62a; and forming an upper magnetic layer 64 to become the rear end part of the upper magnetic pole. Though each of the thin-film coil 66 and photoresist layer 67 is laminated by two stages in this embodiment, the number of stages and the forming procedure are not restricted thereto.

Figure 18:
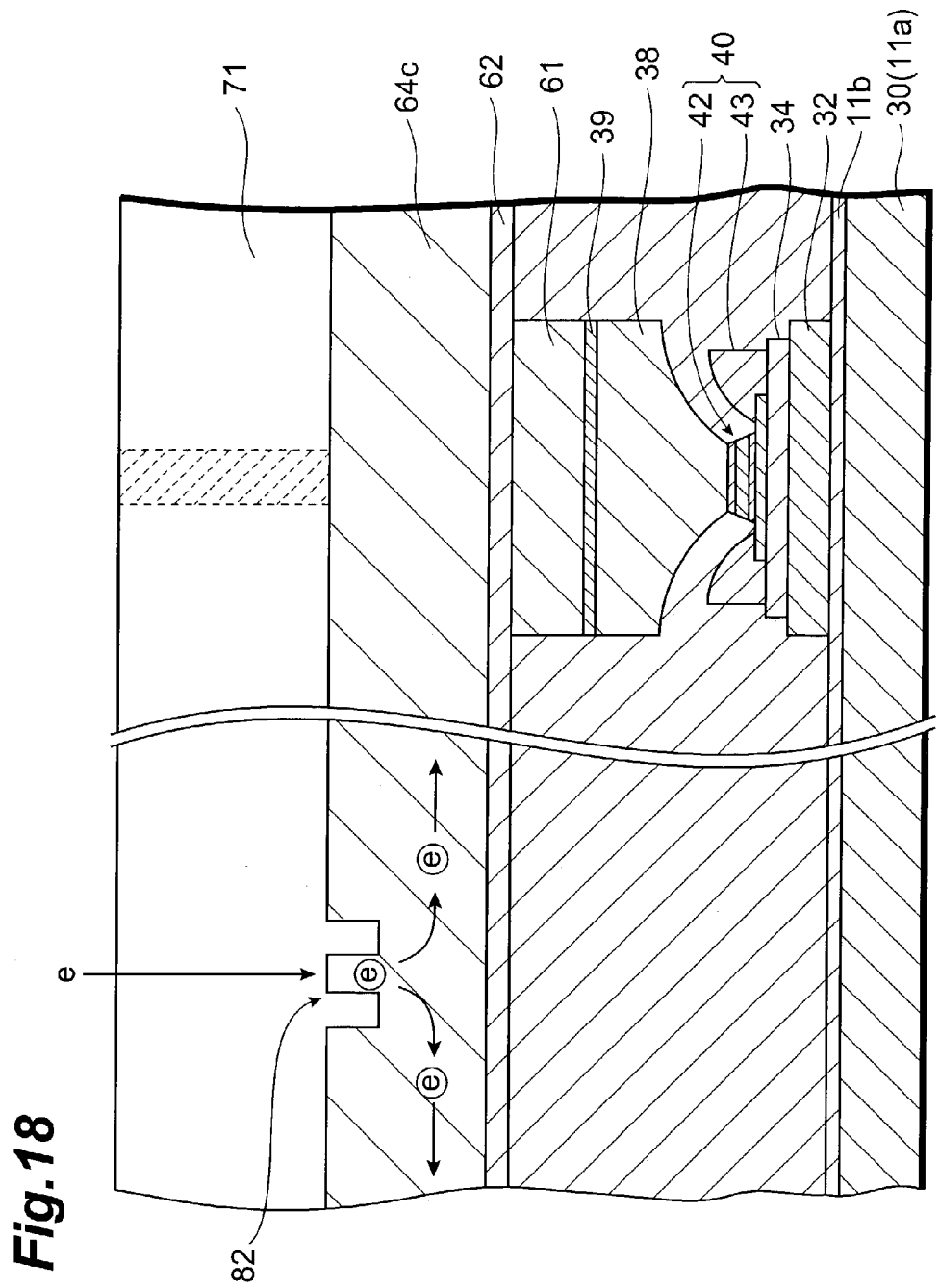
FIG. 18 is a view illustrating a step of a manufacturing process for preparing an upper magnetic pole in a dry scheme, showing a state where a magnetic film is formed with an alignment mark.

The procedure of forming the upper magnetic pole by a dry scheme will now be explained. FIG. 18 is a sectional view taken along the line XVIII—XVIII of FIG. 17. First, a magnetic film 64c to become an upper magnetic pole 64a in a later step is formed by a thickness of about 3 μm by sputtering, for example, on the recording gap layer 62. The magnetic film 64c is formed by an electrically conductive magnetic material such as NiFe having a high saturation flux density, for example. Subsequently, the magnetic film 64c is partly etched in its depth direction, i.e., to such a depth that the electrically insulating recording gap layer 62 disposed thereunder is not exposed, so as to form an alignment mark 82. As a consequence, the alignment mark 82 is electrically connected to its surrounding magnetic film 64c. Then, an electron beam resist 71 is applied onto the magnetic film 64c (on the side opposite from the substrate 30) so as to cover substantially the whole surface of the substrate 30. Here, the electron beam resist 71 is of negative type whose part irradiated with an electron beam will remain as a resist layer.

Subsequently, for correcting a drawing position in a later step, the alignment mark 82 is initially scanned with a position correcting electron beam as indicated by an arrow in FIG. 18, and the intensity of reflected electrons occurring at this time is measured. After the position of the alignment mark 82 is detected according to the intensity of reflected electrons, the position of an optical system irradiating a drawing electron beam in the subsequent step or the position of a stage supporting the substrate is corrected according to thus detected position.

In this embodiment, the alignment mark 82 is electrically connected to the magnetic film 64c. Therefore, when the alignment mark 82 is irradiated with the position correcting electron beam, electric charges of the electron beam flow into the magnetic film 64c without staying in the alignment mark 82. As a consequence, the position correcting electron beam irradiating the alignment mark 82 does not lose its straightforwardness, whereby drawing positions in electron beam lithography can be corrected accurately. Hence, in the subsequent step, the magnetic film 64c can be formed into the upper magnetic pole 64a with a desirable pattern.

In this case, the alignment mark 82 may be irradiated with the position correcting electron beam after an earth pin is brought into contact with the magnetic film 64c as in the stage prior to patterning the TMR film 42. As a consequence, electric charges of the position correcting electron beam irradiating the alignment mark 82 can be led to the outside by way of the magnetic film 64c and earth pin.

After the correction of drawing position of drawing electron beam is completed, a desirable area in the electron beam resist 71 is irradiated with a drawing electron beam from an electron gun (not depicted), so as to form a latent image pattern (region hatched with broken lines in the drawing). Thereafter, post-exposure baking is carried out, and then a developing solution is used, so as to attain a resist layer with a desirable pattern.

Though this embodiment explains a combination thin-film magnetic head comprising the reproducing head section 30 and the recording head section 60, position correcting electron beams can keep their straightforwardness at the time of alignment even in a write-only head not equipped with the reproducing head section 30 when the above-mentioned method is employed therein.

After forming a resist layer, using the resist layer as a mask, the magnetic film 64c is selectively etched by ion milling or the like, for example, so as to form an upper magnetic pole 64a having a desirable narrow pattern. An alternative process may comprise the steps of forming a resist layer having a desirable pattern by using a positive type electron beam resist while leaving the vicinity of the part to be formed with the upper magnetic pole 64a; forming a metal oxide film, for example, by sputtering or the like on the resist layer and the part not covered with the resist layer; and then etching the magnetic film 64c while using the metal oxide film with the desirable pattern obtained by liftoff as a mask. Such a process can also form the upper magnetic pole 64a by using the resist layer.

Figure 19:
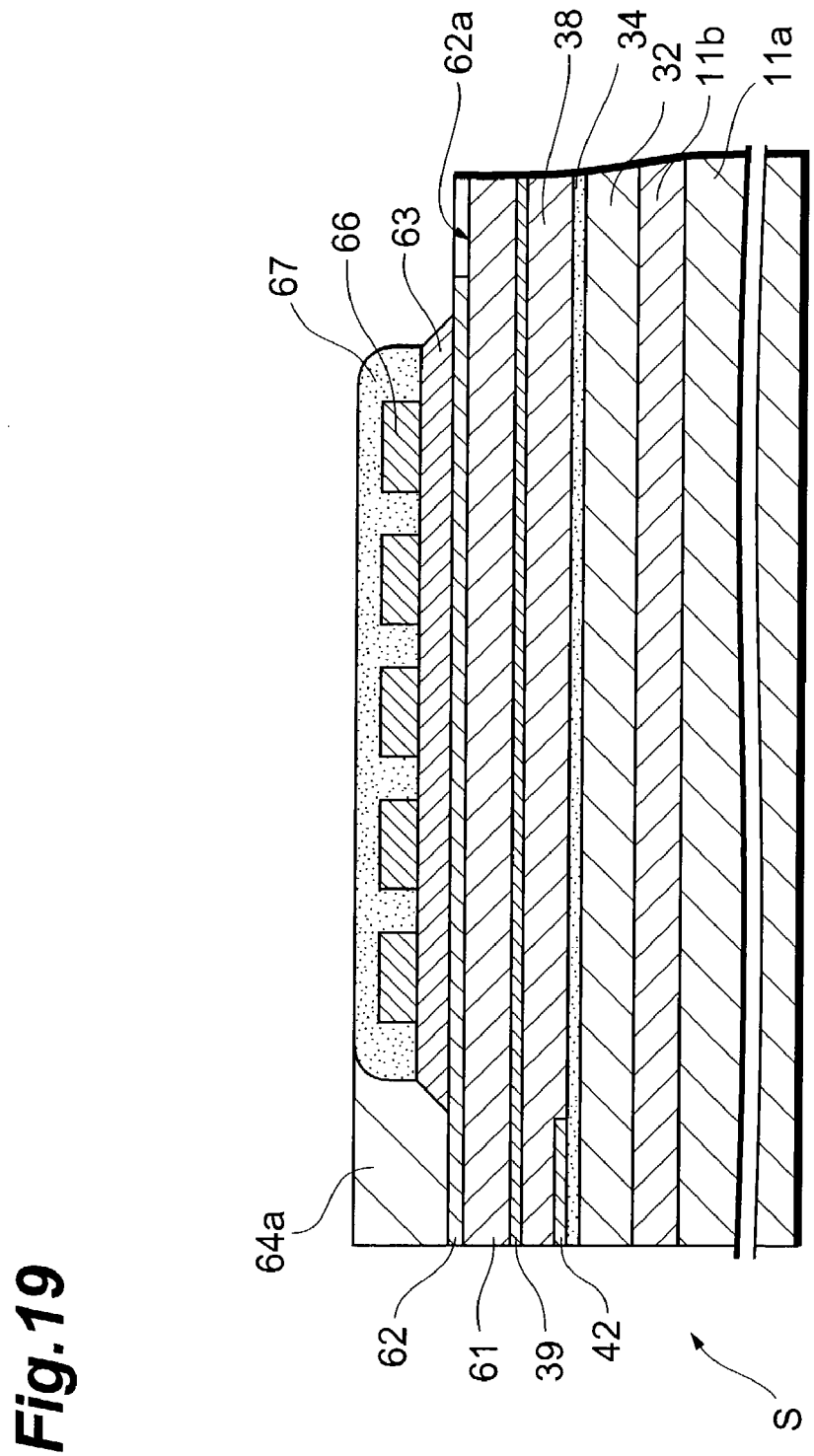
FIG. 19 is a view showing a state where the magnetic film is turned into the upper magnetic pole.

FIG. 19 shows the state formed with the upper magnetic pole 64a (depicted in the same direction as that of FIG. 17). Though the surface level of the first photoresist layer 67 and that of the upper magnetic pole 64a are substantially on a par with each other in this drawing, they are not always required to be formed as such. Thereafter, the second stage of thin-film coil 66 is formed, and the upper magnetic layer 64 (see FIGS. 3 and 21), which is a magnetic pole rear end part, is made such that a core is formed through an opening 62a.

Figure 20:
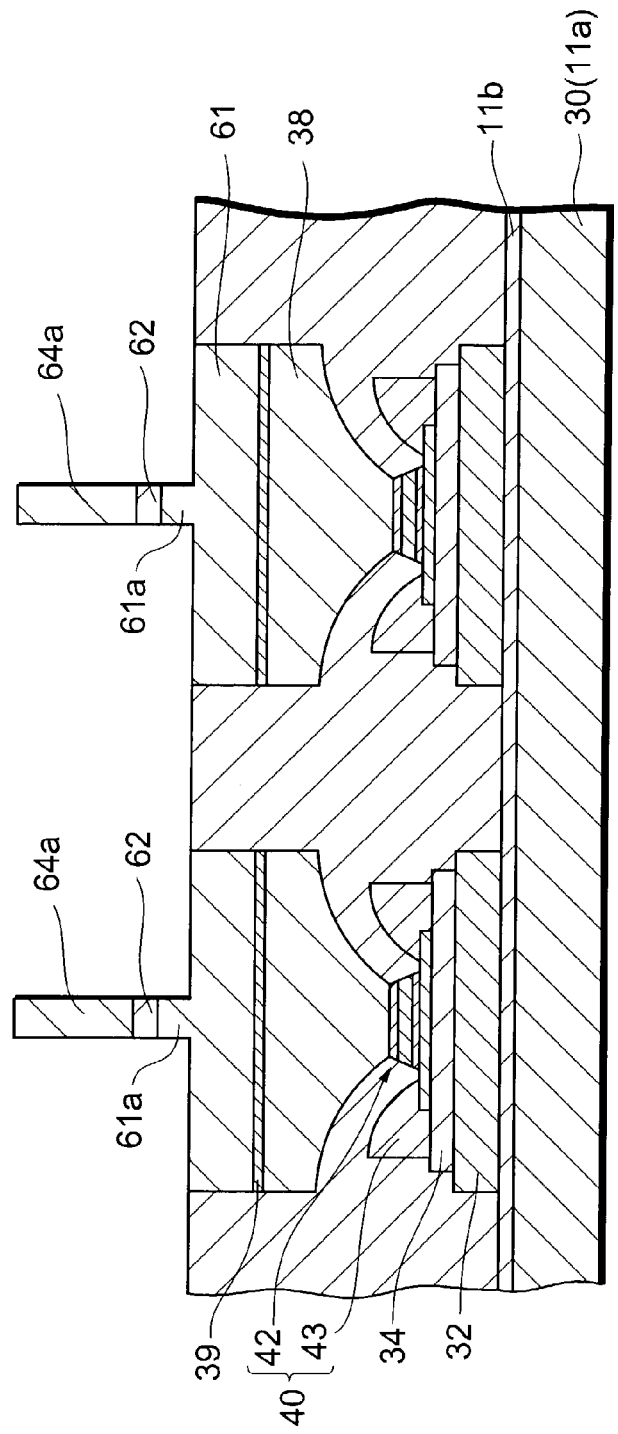
FIG. 20 is a view showing a state where the upper magnetic pole is trimmed, so as to be narrowed.

Next, as shown in FIG. 20, the upper magnetic pole 64a is trimmed so as to be further narrowed, while the upper part of recording gap layer 62 and lower magnetic layer 61 is selectively etched.

Figure 21:
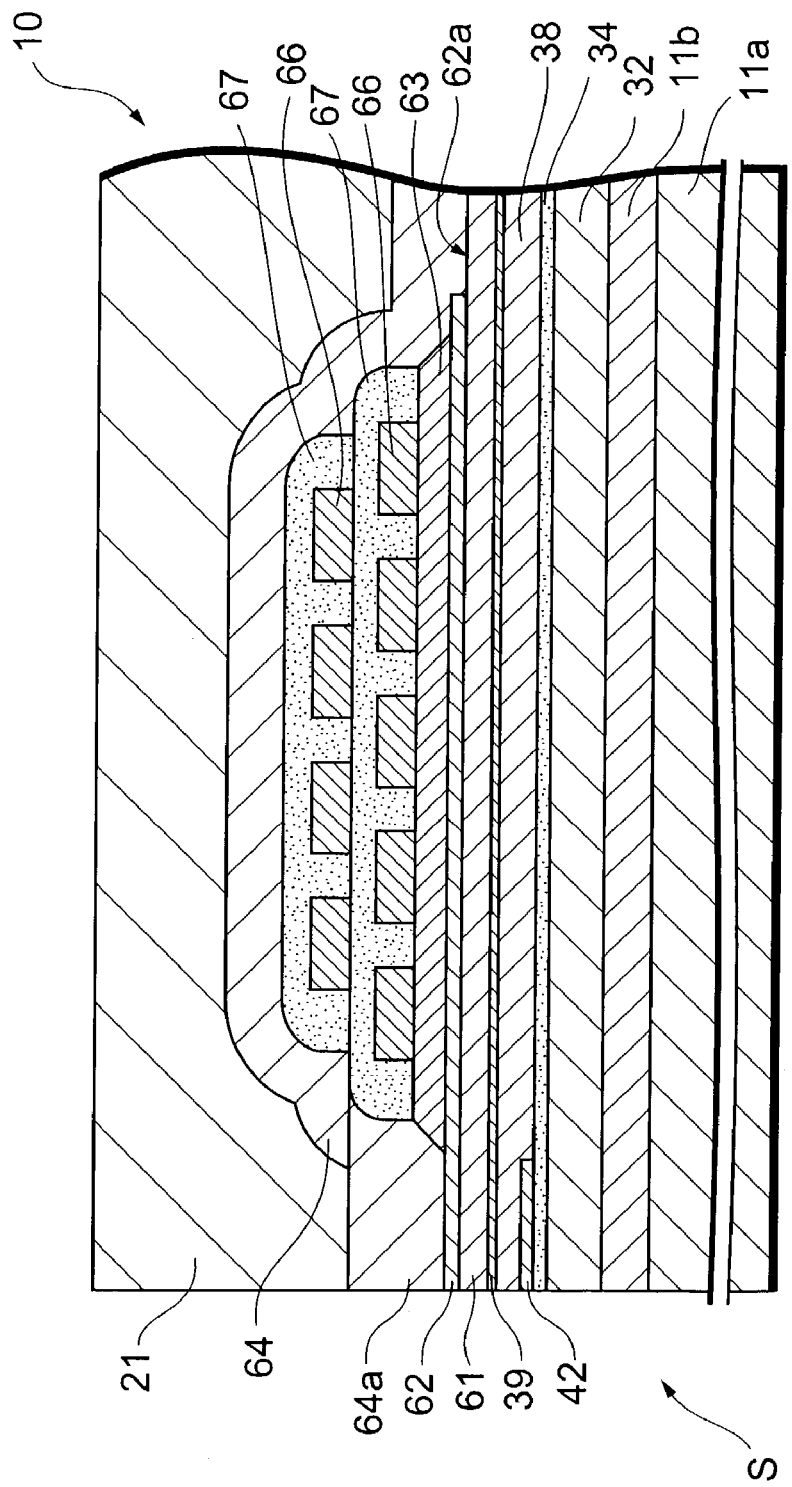
FIG. 21 is a sectional view showing a state formed with an overcoat layer.

Subsequently, as shown in FIG. 21, an overcoat layer 21 made of an insulating material such as Al$_2$O$_3$ is formed by a thickness of about 20 μm to about 30 μm on the upper magnetic pole 64 by sputtering, for example. The foregoing is a manufacturing process of the part corresponding to the recording head section 60 using a dry scheme for preparing the upper magnetic pole 64a.

The following method may also be employed as another mode of this embodiment. Namely, instead of forming an alignment mark by etching the magnetic film 64c, an electrically conductive alignment mark 82 is laminated on the magnetic film 64c (on the side opposite from the substrate 30) at positions other than the region to be formed with the upper magnetic pole 64a. The alignment mark can be formed from a material such as Ta, for example, by a method such as sputtering. Even in the case employing such a configuration, the alignment mark 82 is electrically connected to the magnetic film 64c, whereby electric charges of a position correcting electron beam irradiating the alignment mark 82 flow into the magnetic film 64c without staying within the mark.

Figure 22:
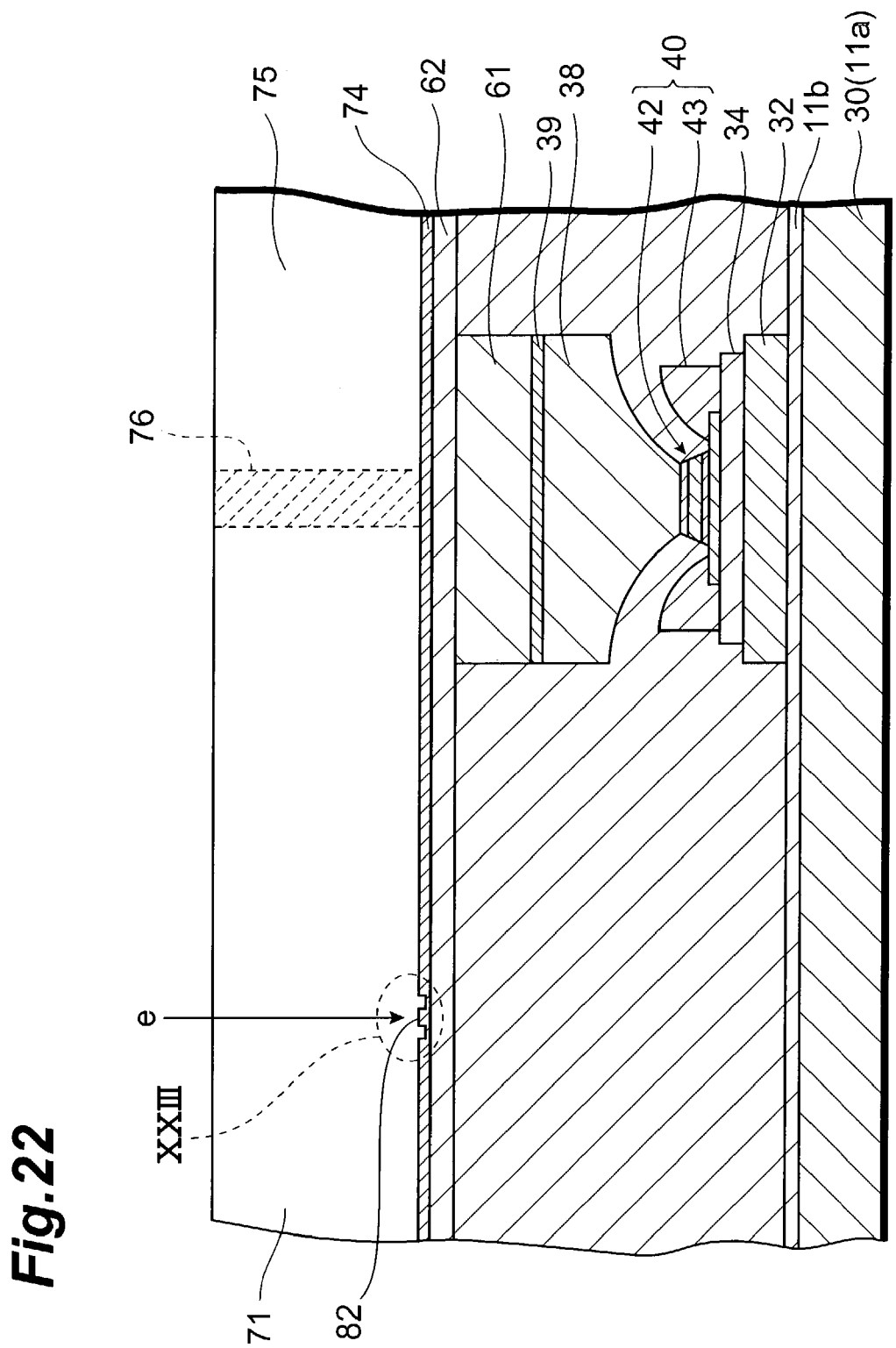
FIG. 22 is a view illustrating a step of a manufacturing process for preparing an upper magnetic pole in a wet scheme, showing a state where a plating electrode is formed on a recording gap layer and then is formed with an alignment mark.
Figure 23:
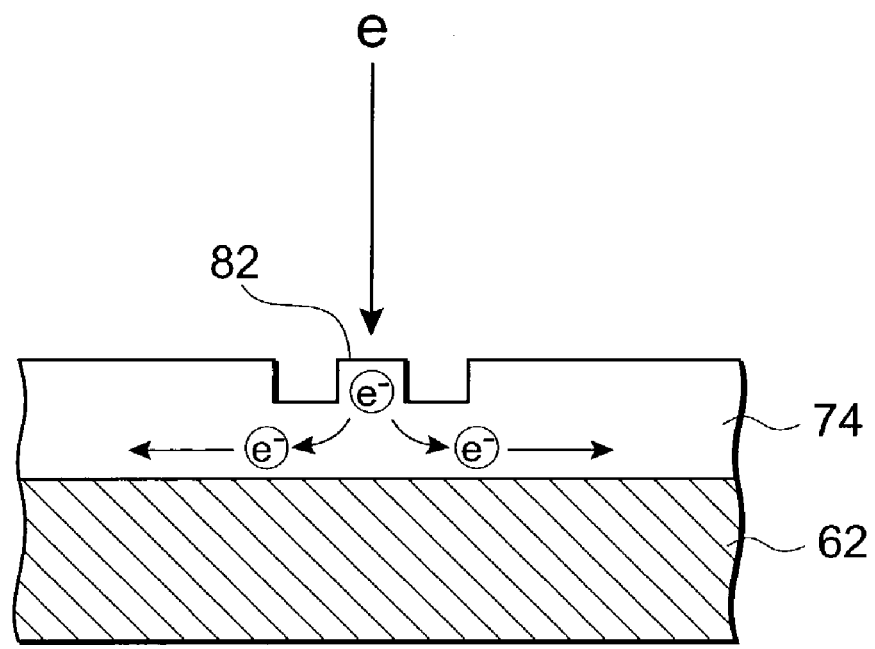
FIG. 23 is an enlarged view of region XXIII in FIG. 22, showing the alignment mark.

With reference to FIGS. 22 and 23, a process of preparing the upper magnetic pole 64a by a wet scheme will now be explained. This process forms the upper magnetic pole 64a by plating in the state shown in FIG. 17, i.e., the state where the photoresist layer 63, thin-film coil 66, and photoresist layer 67 are formed on the recording gap layer 62. FIG. 22 is a sectional view oriented in the same direction as that of FIG. 18, illustrating the state where a plating electrode 74 of Ti/NiFe or the like is formed on the recording gap layer 62 so as to cover substantially the whole surface of the substrate 30 (so as to electrically connect forming positions to be formed with the upper magnetic pole to each other), and is coated with an electron beam resist 75. Here, the electron beam resist 75 is of positive type whose part irradiated with a drawing electron beam is removable whereas the part not irradiated with the drawing electron beam will remain as a resist layer.

Also, as shown in FIG. 23, which is an enlarged view of region XXIII in FIG. 22, an alignment mark 82 is formed prior to the coating with the electron beam resist 75 in this embodiment. The alignment mark 82 is formed by partly etching the plating electrode 74 in its depth direction, i.e., to such a depth that the electrically insulating recording gap layer 62 thereunder is not exposed. As a consequence, the alignment mark 82 is electrically connected to its surrounding plating electrode 74.

Subsequently, for correcting a drawing position in a later step, the alignment mark 82 is initially scanned with a position correcting electron beam as indicated by arrows in FIGS. 22 and 23, and the intensity of reflected electrons occurring at this time is measured. After the position of the alignment mark 82 is detected according to the intensity of reflected electrons, the position of an optical system irradiating a drawing electron beam in the subsequent step or the position of a stage supporting the substrate is corrected according to thus detected position.

In this embodiment, the alignment mark 82 is electrically connected to the plating electrode 74. Therefore, when the alignment mark 82 is irradiated with the position correcting electron beam, electric charges of the electron beam flow into the plating electrode 74, as schematically shown in FIG. 23, without staying in the alignment mark 82. As a consequence, the position correcting electron beam irradiating the alignment mark 82 does not lose its straightforwardness, whereby drawing positions in electron beam lithography can be corrected accurately. Hence, in the subsequent step, the upper magnetic pole 64a with a desirable pattern can be formed on the plating electrode 74, whereby the recording head section 60 can narrow its track width.

In this case, the alignment mark 82 may be irradiated with the position correcting electron beam after an earth pin is brought into contact with the plating electrode 74 as in the stage prior to patterning the TMR film 42. As a consequence, electric charges of the position correcting electron beam irradiating the alignment mark 82 can be led to the outside by way of the plating electrode 74 and earth pin.

After the correction of drawing position of drawing electron beam is completed, a desirable area in the electron beam resist 75 is irradiated with a drawing electron beam from an electron gun (not depicted) and then is subjected to post-exposure baking, and thereafter a developing solution is used, whereby the electron beam irradiation region 76 hatched with broken lines in FIG. 22 dissolves into the solvent, thus leaving the region not irradiated with the drawing electron beam as a positive type resist layer.

After removing the electron beam irradiation region 76 with the solvent, plating is carried out while using the resist layer not irradiated with the drawing electron beam as a mask, so as to form the upper magnetic pole 64a with a desirable narrow pattern (see FIG. 20) on the plating electrode 74.

Thereafter, as in the case preparing the upper magnetic pole 64a by a dry scheme, the second stage of thin-film coil 66 is formed, and the upper magnetic layer 64 to become a magnetic pole rear end part is formed so as to make a core. Then, the upper magnetic pole 64a is trimmed so as to be further narrowed, while the upper part of the recording gap layer 62 and lower magnetic layer 61 is selectively etched, whereby the overcoat layer 21 made of an insulating material is formed as shown in FIG. 21. The foregoing is the manufacturing process of the upper magnetic pole 64a using a plating scheme.

The following method may also be employed as another mode of this embodiment. Namely, instead of forming an alignment mark by etching the plating electrode 74, an electrically conductive alignment mark 82 is laminated on the plating electrode 74 (on the side opposite from the substrate 30) at positions other than the region to be formed with the upper magnetic pole 64a. The alignment mark can be formed from a material such as Ta, for example, by a method such as sputtering. Even in the case employing such a configuration, the alignment mark 82 is electrically connected to the plating electrode 74, whereby electric charges of a position correcting electron beam irradiating the alignment mark 82 flow into the plating electrode 74 without staying within the mark.

Though an example in which the front end part of the upper magnetic pole is formed separately from the rear end part thereof is shown in both of the above-mentioned dry and plating schemes, the forming of upper magnetic pole in accordance with the present invention is not restricted thereto, whereas the front and rear end parts of the magnetic pole may be formed at the same time. In the latter case, it will be sufficient if the individual parts of thin-film coil 66 and photoresist layer 67 are formed, predetermined steps are carried out, and then the present invention is used for forming the upper magnetic layer acting as both the front and rear end parts of the upper magnetic pole.

Figure 24A:
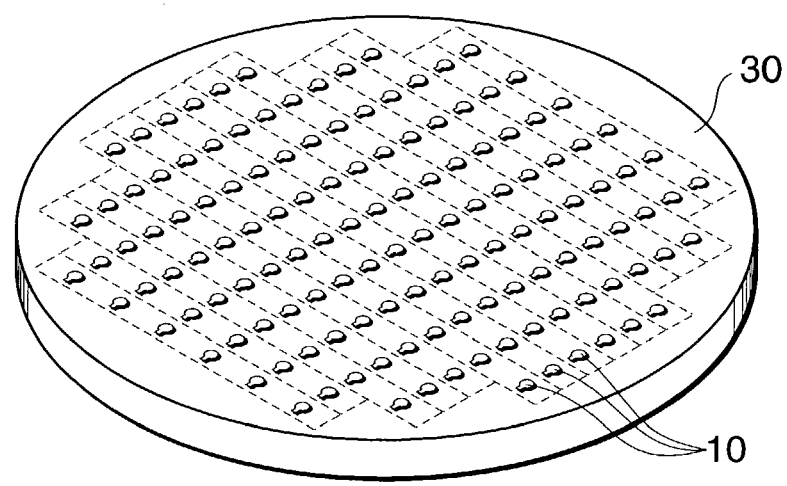
Figure 24B:
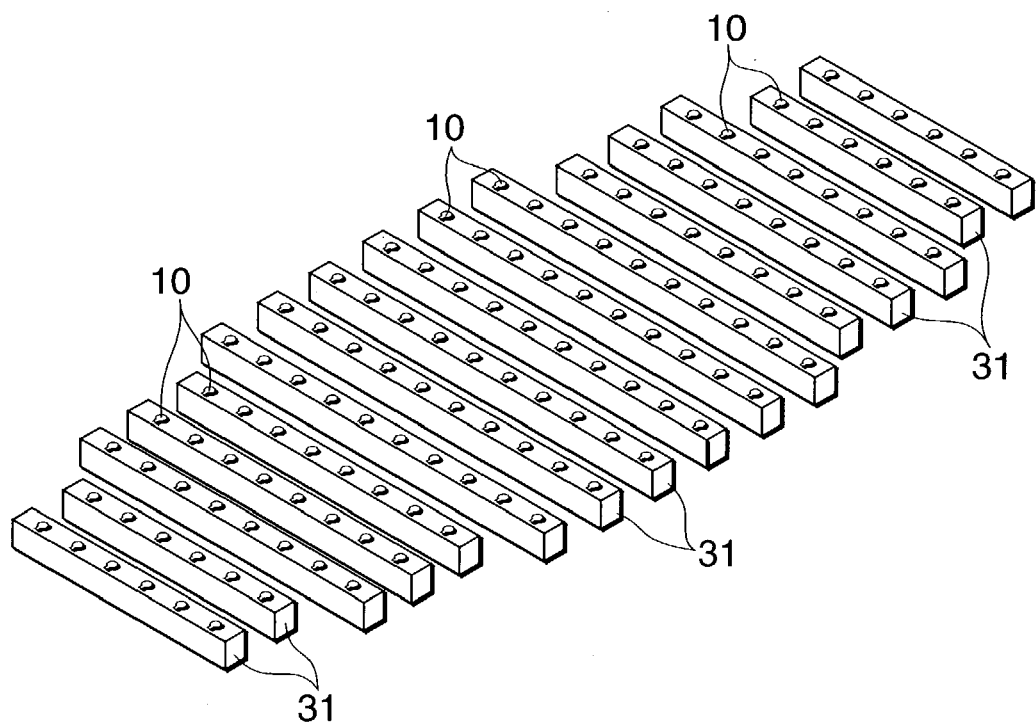
FIG. 24B is a perspective view showing bars obtained by cutting the substrate.

The foregoing accomplishes the part corresponding to the recording head section 60 of the thin-film magnetic head 10. Since a plurality of thin-film magnetic heads 10 are formed on the substrate 30 at this stage as shown in FIG. 24A, the substrate 30 is initially cut as shown in FIG. 24B, so as to yield a plurality of bars 31. The magnetoresistive device assembly in this specification is a concept encompassing not only both of a substrate formed with a plurality of thin-film magnetic heads 10 as shown in FIG. 24A and a bar cut from the substrate as shown in FIG. 24B, but also all the forms each mounted with a plurality of thin-film magnetic heads 10 obtained by cutting a bar 31, for example.

Here, a magnetoresistive device assembly in accordance with this embodiment will be explained. As mentioned above, the magnetoresistive device assembly shown in FIG. 24A comprises the substrate 30 having an electrically insulating surface, the TMR film (magnetoresistive film) 42 formed on the substrate, and the alignment mark 82 (see FIG. 9) formed on the substrate. Also, even in the state of a magnetoresistive device assembly, the alignment mark 82 is electrically connected to an electrically conductive layer, which used to be a part of the multilayer film 42a, by way of the base film 81. This electrically conductive layer is obtained from the same electrically conductive multilayer film 42a as with the TMR film 42.

Namely, in the magnetoresistive device assembly in accordance with this embodiment, the alignment mark 82 has originally been electrically connected to the multilayer film 42a, which is a source of the electrically conductive layer and TMR film 42. When the alignment mark 82 is irradiated with a position correcting electron beam in the process of making the assembly, electric charges of the position correcting electron beam flow into the multilayer film 42a without staying in the alignment mark 82. Therefore, the position correcting electron beam irradiating the alignment mark 82 does not lose its straightforwardness, whereby drawing positions in electron beam lithography can be corrected accurately. As a consequence, the TMR film 42 obtained from the multilayer film 42a attains a high positional accuracy.

Also, as shown in FIG. 9, the electrically conductive layer and TMR film 42 have the same laminate pattern. In such a magnetoresistive device assembly, the electrically conductive layer and TMR film 42 can be obtained from the same multilayer film 42a. In this case, the alignment mark 82 has originally been electrically connected to the multilayer film 42a, which is a source of the electrically conductive layer and TMR film 42. Therefore, even when the alignment mark 82 is irradiated with a position correcting electron beam in the process of making the assembly, electric charges of the electron beam flow into the multilayer film 42a without staying in the alignment mark 82. As a consequence, the position correcting electron beam does not lose its straightforwardness, whereby drawing positions in electron beam lithography can be corrected accurately. Hence, the TMR film 42 obtained from the multilayer film 42a attains a high positional accuracy.

Figure 25:
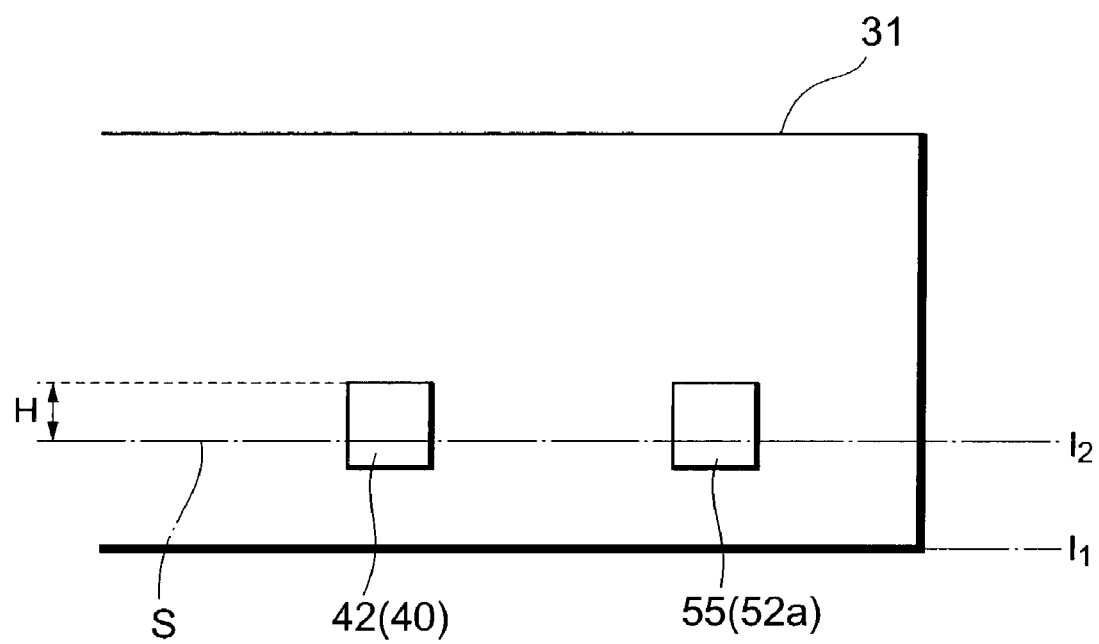
FIG. 25 is a view illustrating a lapping process for MR height adjustment.

Subsequently, as shown in FIG. 25, lapping (grinding) for adjusting the MR height is carried out at the stage where such a bar 31 is prepared. This drawing schematically shows only the TMR film 42 on the bar 31 and the process monitoring device 55 shown in FIG. 16 (in the state seen from above the bar 31 in FIG. 24B). The lapping is carried out from dash-single-dot line $l_1$ toward dash-single-dot line $l_2$, and is terminated at the time when the distance H from the lapping surface to the rear end part of the TMR film 42 equals a predetermined MR height. The resistance of the process monitoring device 55 may be measured, and the distance H can be determined according to thus measured ohmic value.

After the lapping is completed, the bar 31 is cut into blocks each having a thin-film magnetic head 10. Then, a slider rail is formed by ion milling or the like, whereby the slider 11 shown in FIG. 2 is obtained. Further, the slider 11 is mounted to gimbals 12 and then is connected to a suspension arm 13, whereby the head gimbal assembly 15 shown in FIG. 1 is accomplished. In the head gimbal assembly 15 made by way of the process mentioned above, tracks of the TMR film 42 are formed at desirable locations due to electron beam lithography whose position is accurately corrected, and a narrow track width is formed with a high dimensional precision, whereby its magnetic information reproducing performance is very high.

After the head gimbal assembly 15 is prepared, it is assembled such that the slider 11 is movable above the hard disk 2 while making it possible to record and reproduce magnetic signals, whereby the hard disk drive 1 shown in FIG. 1 is accomplished. The hard disk drive 1 manufactured by way of the process mentioned above can realize a high areal density, since tracks of the TMR film are formed at desirable locations due to electron beam lithography whose position is accurately corrected while a narrow track width is formed with a high dimensional precision.

Though the invention achieved by the inventors is specifically explained according to embodiments, the present invention should not be restricted to the above-mentioned embodiments. For example, drawing positions in electron beam lithography can be corrected accurately even in the case where the MR device utilizing the magnetoresistive film is an AMR device using an AMR film, a GMR device using a GMR film, or the like instead of the TMR device.

As explained in the foregoing, the present invention can accurately correct drawing positions in electron beam lithography.

The basic Japanese Application No. 2002-89468 filed on Mar. 27, 2002 is hereby incorporated by reference.

What is claimed is:

1. A magnetoresistive device assembly equipped with a plurality of magnetoresistive devices each having a magnetoresistive film, said magnetoresistive device assembly comprising:
   a substrate having an electrically insulating surface;
   said magnetoresistive film formed on said substrate;
   an alignment mark formed on said substrate, a position of said alignment mark being corrected with an electron beam; and
   an electrically conductive layer electrically connected to said alignment mark;
   wherein said electrically conductive layer and said magnetoresistive film are obtained from the same electrically conductive multilayer film.

2. A magnetoresistive device assembly equipped with a plurality of magnetoresistive devices each having a magnetoresistive film, said magnetoresistive device assembly comprising:
   a substrate having an electrically insulating surface;
   said magnetoresistive film formed on said substrate;
   an alignment mark formed on said substrate, a position of said alignment mark being corrected with an electron beam; and
   an electrically conductive layer electrically connected to said alignment mark;
   wherein said electrically conductive layer and said magnetoresistive film have the same laminate pattern.

* * * * *